(12) United States Patent
Stearns et al.

(10) Patent No.: US 8,153,700 B2
(45) Date of Patent: Apr. 10, 2012

(54) ROOFING SYSTEM AND METHOD

(75) Inventors: Brian Cecil Stearns, Stowe, VT (US); Douglas Timothy Lounsbury, Troy, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 90 days.

(21) Appl. No.: 12/727,726

(22) Filed: Mar. 19, 2010

(65) Prior Publication Data

US 2010/0307074 A1 Dec. 9, 2010

Related U.S. Application Data

(60) Provisional application No. 61/161,668, filed on Mar. 19, 2009.

(51) Int. Cl.
*E04B 1/68* (2006.01)
(52) U.S. Cl. ........................ 521/58; 52/173.1; 52/745.21
(58) Field of Classification Search .............. 52/58, 60, 52/24–26, 698, 173.1, 173.3, 302.1, 302.6, 52/302, 7, 97, 408, 741.4; 126/621, 623; 136/244; 248/237, 500, 505; 285/42, 43; 411/439, 542
See application file for complete search history.

(56) References Cited

U.S. PATENT DOCUMENTS

| | | | |
|---|---|---|---|
| 0,473,512 A | 4/1892 | Laird | |
| 0,756,884 A | 4/1904 | Parry | |
| 1,646,923 A | 10/1927 | Martens | |
| 1,925,263 A | 9/1933 | Levow | |
| 2,079,768 A | 5/1937 | Levow | |
| 2,349,467 A | 5/1944 | Scott | |
| D139,568 S | 11/1944 | Hinchman | |
| 2,890,664 A | 6/1959 | Rachlin | |
| 2,925,976 A | 2/1960 | Martin | |
| D188,221 S | 6/1960 | Maro | |
| 3,141,532 A | 7/1964 | Runyan | |
| 3,182,762 A | 5/1965 | Syak et al. | |

(Continued)

FOREIGN PATENT DOCUMENTS

CH 204783 5/1939

(Continued)

OTHER PUBLICATIONS

Affordable Solar, UniRac PRO-PAK Standard Rail 204, available at least as early as Jan. 9, 2009.

(Continued)

*Primary Examiner* — Basil Katcheves
*Assistant Examiner* — Beth Stephan
(74) *Attorney, Agent, or Firm* — Michael Best & Friedrich LLP

(57) ABSTRACT

A roof mounting system can include a roof substrate and flashing supportable on the substrate and including an outwardly extending projection having a concave interior side and an aperture extending through the projection between top and bottom surfaces of the flashing. A seal can extend through the aperture and contact at least a portion of the top surface and at least a portion of the bottom surface. The seal can be conformable with the concave interior side and can define a seal aperture substantially aligned with the flashing aperture. A mounting bracket can be supportable on the flashing and can define an aperture sized to receive at least a portion of each of the seal and the projection. A fastener can extend through the mounting bracket aperture, seal aperture, and flashing aperture to inhibit fluid flow through the flashing aperture.

50 Claims, 25 Drawing Sheets

U.S. PATENT DOCUMENTS

| | | | |
|---|---|---|---|
| 3,633,862 | A | 1/1972 | Breen |
| 3,880,405 | A | 4/1975 | Brueske |
| 3,998,019 | A | 12/1976 | Reinwall, Jr. |
| 4,226,058 | A * | 10/1980 | Riley .................................. 52/27 |
| 4,269,012 | A | 5/1981 | Mattingly et al. |
| 4,321,745 | A | 3/1982 | Ford |
| 4,325,178 | A | 4/1982 | Pruehs |
| 4,348,846 | A | 9/1982 | Bellem |
| 4,367,864 | A | 1/1983 | Eldeen |
| 4,404,962 | A | 9/1983 | Zinn et al. |
| 4,554,773 | A * | 11/1985 | Conley ............................ 52/521 |
| D293,203 | S | 12/1987 | Hertensteiner |
| D294,904 | S | 3/1988 | Bleskachek |
| 4,763,456 | A | 8/1988 | Giannuzzi |
| 4,796,403 | A | 1/1989 | Fulton et al. |
| 4,892,429 | A | 1/1990 | Giannuzzi |
| 4,903,997 | A | 2/1990 | Kifer |
| 4,927,305 | A | 5/1990 | Peterson, Jr. |
| 5,082,412 | A * | 1/1992 | Thomas ......................... 411/533 |
| 5,127,205 | A | 7/1992 | Eidson |
| 5,207,043 | A | 5/1993 | McGee et al. |
| 5,217,191 | A | 6/1993 | Smith |
| 5,228,248 | A | 7/1993 | Haddock |
| 5,353,473 | A | 10/1994 | Sherick |
| 5,431,372 | A | 7/1995 | Kostelecky |
| 5,483,772 | A | 1/1996 | Haddock |
| 5,491,931 | A | 2/1996 | Haddock |
| D368,648 | S | 4/1996 | Losier |
| 5,528,872 | A * | 6/1996 | Rotter .......................... 52/748.1 |
| 5,547,226 | A | 8/1996 | Wentworth |
| 5,557,903 | A | 9/1996 | Haddock |
| 5,609,326 | A | 3/1997 | Stearns et al. |
| 5,613,328 | A | 3/1997 | Alley |
| 5,685,508 | A | 11/1997 | Smith |
| 5,687,936 | A | 11/1997 | Wilson |
| D388,136 | S | 12/1997 | Lecocq et al. |
| 5,692,352 | A * | 12/1997 | Simpson ......................... 52/545 |
| 5,694,721 | A | 12/1997 | Haddock |
| 5,715,640 | A | 2/1998 | Haddock |
| 5,797,232 | A | 8/1998 | Larson |
| 5,813,649 | A | 9/1998 | Peterson et al. |
| 5,873,201 | A * | 2/1999 | Fey .................................. 52/27 |
| 5,882,043 | A | 3/1999 | Murphy et al. |
| D409,078 | S | 5/1999 | Bolt |
| 5,983,588 | A | 11/1999 | Haddock |
| D426,453 | S | 6/2000 | Stearns et al. |
| D428,799 | S | 8/2000 | Stearns et al. |
| D430,005 | S | 8/2000 | Stearns et al. |
| 6,164,033 | A | 12/2000 | Haddock |
| 6,193,455 | B1 * | 2/2001 | Levey ............................ 411/179 |
| 6,354,046 | B1 | 3/2002 | Swearingen |
| 6,360,491 | B1 | 3/2002 | Ullman |
| 6,414,237 | B1 | 7/2002 | Boer |
| 6,470,629 | B1 | 10/2002 | Haddock |
| 6,514,005 | B2 * | 2/2003 | Shiokawa et al. ........... 403/408.1 |
| 6,526,701 | B2 | 3/2003 | Stearns et al. |
| 6,536,729 | B1 * | 3/2003 | Haddock ....................... 248/300 |
| 6,718,718 | B2 | 4/2004 | Haddock |
| 6,868,647 | B2 * | 3/2005 | Poldmaa .................... 52/749.12 |
| 7,013,612 | B2 | 3/2006 | Haddock |
| 7,069,698 | B2 | 7/2006 | Nee |
| 7,100,338 | B2 | 9/2006 | Haddock |
| 7,260,918 | B2 | 8/2007 | Liebendorfer |
| 7,434,362 | B2 | 10/2008 | Liebendorfer |
| 7,703,256 | B2 | 4/2010 | Haddock |
| D617,174 | S | 6/2010 | Schaefer et al. |
| 7,758,011 | B2 | 7/2010 | Haddock |
| 7,762,027 | B1 * | 7/2010 | Wentworth et al. ........... 52/173.3 |
| 7,789,365 | B2 * | 9/2010 | Durig et al. .................... 248/300 |
| 7,900,413 | B2 | 3/2011 | Stanley |
| 7,935,202 | B2 | 5/2011 | Stanley |
| 2002/0088196 | A1 | 7/2002 | Haddock |
| 2002/0131842 | A1 * | 9/2002 | Eriksson ....................... 411/399 |
| 2003/0101662 | A1 | 6/2003 | Ullman |
| 2003/0177706 | A1 | 9/2003 | Ullman |
| 2004/0173373 | A1 | 9/2004 | Wentworth et al. |
| 2007/0245636 | A1 | 10/2007 | Ayer et al. |
| 2007/0266672 | A1 | 11/2007 | Bateman et al. |
| 2007/0289233 | A1 | 12/2007 | Haddock |
| 2007/0295393 | A1 | 12/2007 | Cinnamon |
| 2008/0000173 | A1 | 1/2008 | Lenox et al. |
| 2008/0087275 | A1 | 4/2008 | Sade et al. |
| 2008/0121273 | A1 | 5/2008 | Plaisted et al. |
| 2008/0190047 | A1 | 8/2008 | Allen |
| 2008/0245404 | A1 | 10/2008 | DeLiddo |
| 2008/0302407 | A1 | 12/2008 | Kobayashi |
| 2008/0313976 | A1 | 12/2008 | Allen |
| 2009/0025314 | A1 | 1/2009 | Komamine et al. |
| 2009/0309388 | A1 * | 12/2009 | Ellison ........................... 296/191 |
| 2010/0192505 | A1 | 8/2010 | Schaefer et al. |
| 2011/0120047 | A1 | 5/2011 | Stearns et al. |
| 2011/0247279 | A1 | 10/2011 | Stearns et al. |
| 2011/0247295 | A1 | 10/2011 | Stearns et al. |

FOREIGN PATENT DOCUMENTS

| | | |
|---|---|---|
| CH | 671063 A5 | 7/1989 |
| DE | 3716491 A1 | 12/1988 |
| DE | 3723020 A1 | 1/1989 |
| GB | 666147 | 2/1952 |
| JP | 5-346055 | 12/1993 |
| JP | 8193392 | 7/1996 |

OTHER PUBLICATIONS

Affordable Solar, Solar Panel Mounts & Solar Trackers for Solar Power Systems, available at least as early as Jan. 9, 2009.

Professional Solar Products Inc., FastJack Leveling Kits, available at least as early as Jan. 9, 2009.

Professional Solar Products Inc., FastJack Installation Manual, modified Sep. 10, 2007.

Professional Solar Products Inc., FastJack Commercial Fast Jack, Commercial Leveling Kit, Comparison Chart for the Fast Jack, available at least as early as Jan. 9, 2009.

Professional Solar Products Inc., Fast Jack, available at least as early as Jan. 9, 2009.

"E-Ton Solar" Brochure, E-Ton Solar Tech. Co., Ltd. (Available at least as early as Oct. 20, 2011).

"Fall Protection in Contruction", OSHA Laws 3146; 1995.

"Genmounts Solar Racking Systems" Brochure (Available at least as early as Oct. 20, 2011).

"Mage Powertec Kits" Brochure, Mage Solar Projects, Inc. (Available at least as early as Oct. 20, 2011).

Non-Final Office Action, U.S. Appl. No. 13/166,378, mailed Sep. 19, 2011.

Non-Final Office Action, U.S. Appl. No. 12/914,209, mailed Sep. 20, 2011.

Non-Final Office Action, U.S. Appl. No. 13/166,542, mailed Sep. 16, 2011.

Omco Solar Brochure (Available at least as early as Oct. 20, 2011).

"Orion Solar Racking Jupiter Series Ground Mount System" Brochure, Orion Solar Racking (Available at least as early as Oct. 20, 2011).

"Phono Solar Tigo Energy Smart Module" Brochure, Phono Solar Technology Co., Ltd. (Available at least as early as Oct. 20, 2011).

"Polar Racking PolaRail Flush Mount Racking System" Brochure, Polar Racking Inc. Brochure, Schletter Inc. (Available at least as early as Oct. 20, 2011).

"PowAR Grip Product Sheet", A Raymond Tinnerman Industrial, Inc. (Available at least as early as Oct. 20, 2011).

Product Advertisement, "Alpine Snowguards/Setting the Industry Standard/Snow Guards for Every Roof Type" Mar. 27, 2000.

Product Advertisement, "Speedstand", Contractors Guide, Jun. 2000.

Product Description—"An Innovative Approach to Zero Roof Penetrations", Portable, Pipe Hangers, Inc., printed Jul. 2000.

Product Description—"Gecko-An Introduction", Gecko Safety Systems, Fall Arrest Protection, printed Jul. 2000.

Product Description—"Instruction and Specification Manual, Super Anchor: Fall Arrest Anchor. ARS-2.times.8 and ARS-2.times.12", 1993.

Product Description—"Super Anchor: Instruction/Specification Manual: Stainless Steel Fall Arrest Anchors ARS 2. times.8, ARS 2.times.12, I-Joist, Moveable ARS, Vertical Wall Anchor, and Custom Anchor", Mar. 2000.

Product Description—Anchor Guardrails, printed Aug. 2000.
Product Description—Gecko-An Introduction, Gecko Safety Systems, Ltd., printed Mar. 2000.
Product Description—Portable Pipe Hangers, Inc., Inter517face, Jun. 2000.
Product Description—Portable Pipe Hangers, printed Aug. 2000.
"Prysmian Cables & Systems Photovoltaic (PV) System Products" Product Sample and Brochure, Prysmian Power Cables and Systems USA, LLC (Available at least as early as Oct. 20, 2011).
"Quick Mount PV" Brochure (Available at least as early as Oct. 20, 2011).
Quickscrews International Corporation brochure (Available at least as early as Jun. 29, 2011).
"Rapid2+ Clamp Product Sheet", Schletter Inc. (Available at least as early as Oct. 20, 2011).
"S-5! CorruBracket" Brochure, Metal Roof Innovations, Ltd. (Available at least as early as Oct. 20, 2011).
S-5! Dirimak Brochure (Available at least as early as Jul. 18, 2011).
S-5! Dirimak Product Photographs (Available at least as early as Jul. 18, 2011).
"S-5! S-5-U and S-5-U Mini" Brochure, Metal Roof Innovations, Ltd. (Available at least as early as Oct. 20, 2011).
"S-5! VersaBracket" Brochure, Metal Roof Innovations, Ltd. (Available at least as early as Oct. 20, 2011).
"Schletter Professional Solar Mounting Systems Mounting and Project Planning" Brochure, Schletter Inc. (Available at least as early as Oct. 20, 2011).
"Solar Power International 11 SPI Daily News—Thursday, Oct. 20, 2011" Solar Power International 2011.
"Solar Security Fasteners" Brochure, Duncan Solar (Available at least as early as Oct. 20, 2011).
"Sunmodo Ez Roof Mount Installation Guide" (Available at least as early as Oct. 20, 2011).
"Sunmodo Ez Roof Mount L Foot for Shingle Roofs" Brochure (Available at least as early as Oct. 20, 2011).
"Sunmodo Ez Roof Mount Standoff for Metal Roofs" Brochure (Available at least as early as Oct. 20, 2011).
"Sunmodo Ez Roof Mount Standoff for Shingle Roofs" Brochure (Available at least as early as Oct. 20, 2011).
"Sunmodo Solar Mounting System" Brochure (Available at least as early as Oct. 20, 2011).

"Tecsun (UL) PV-Wire" Brochure, Prysmian Cables and Systems USA, LLC Brochure, Schletter Inc. (Available at least as early as Oct. 20, 2011).
TileTrac Product Photograph (Available at least as early as Jun. 8, 2011).
"TileTrac Tile Roof Structural Attachment" Brochure, Professional Solar Products, Inc., Copyright Mar. 2011.
UFD (Universal Fastening Disc) Installation Instructions and Design Drawings (Available at least as early as Jul. 14, 2011).
"Zilla Racking & Mounting Components" Zilla Corporation, Copyright 2011.
"Zilla the King of Racking Racking Systems" Brochure, Zilla Corporation (Available at least as early as Oct. 20, 2011).
"Zilla Zip Flashing Assembly Instructions" Zilla Corporation, Copyright 2011.
"Zilla Zip Single-Bolt Flashing Assembly" Brochure, Zilla Corporation, Copyright 2011.
"Zilla Zip Single-Bolt Flashing Assembly" Zilla Corporation, Copyright 2011.
MacDonald, "Inspecting the Scaffold" and Protective Roofing Products LTD. advertisement, Roofing Contractor 6.00, (available at least as early as Oct. 20, 2011).
Product Advertisement—Sarna, Sarnafil Division, (available at least as early as Oct. 20, 2011).
Product Description—"Flat Roof Safety System", POHL Roof and Safety Systems, Securant, (available at least as early as Oct. 20, 2011).
Product Description—FLUX-Boy, (available at least as early as Oct. 20, 2011).
Office Action from United States Patent and Trademark Office for U.S. Appl. No. 13/271,633 dated Dec. 5, 2011, 7 pages.
Office Action from United States Patent and Trademark Office for U.S. Appl. No. 13/270,419 dated Dec. 22, 2011, 7 pages.
Office Action from United States Patent and Trademark Office for U.S. Appl. No. 13/272,938 dated Dec. 22, 2011, 9 pages.
Office Action from United States Patent and Trademark Office for U.S. Appl. No. 13/270,385 dated Dec. 23, 2011, 7 pages.
Office Action from United States Patent and Trademark Office for U.S. Appl. No. 12/914,209 dated Jan. 27, 2012, 5 pages.

* cited by examiner

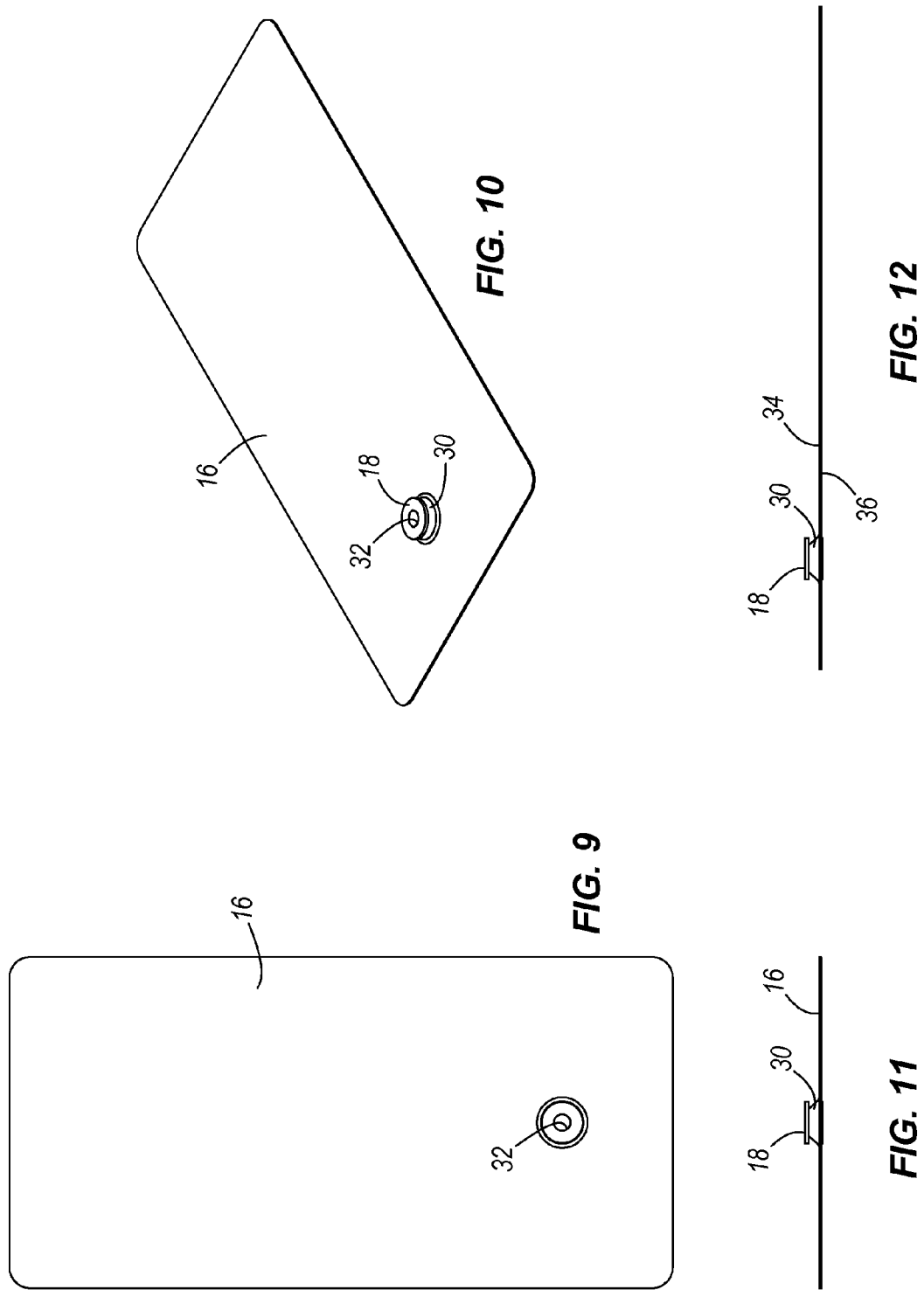

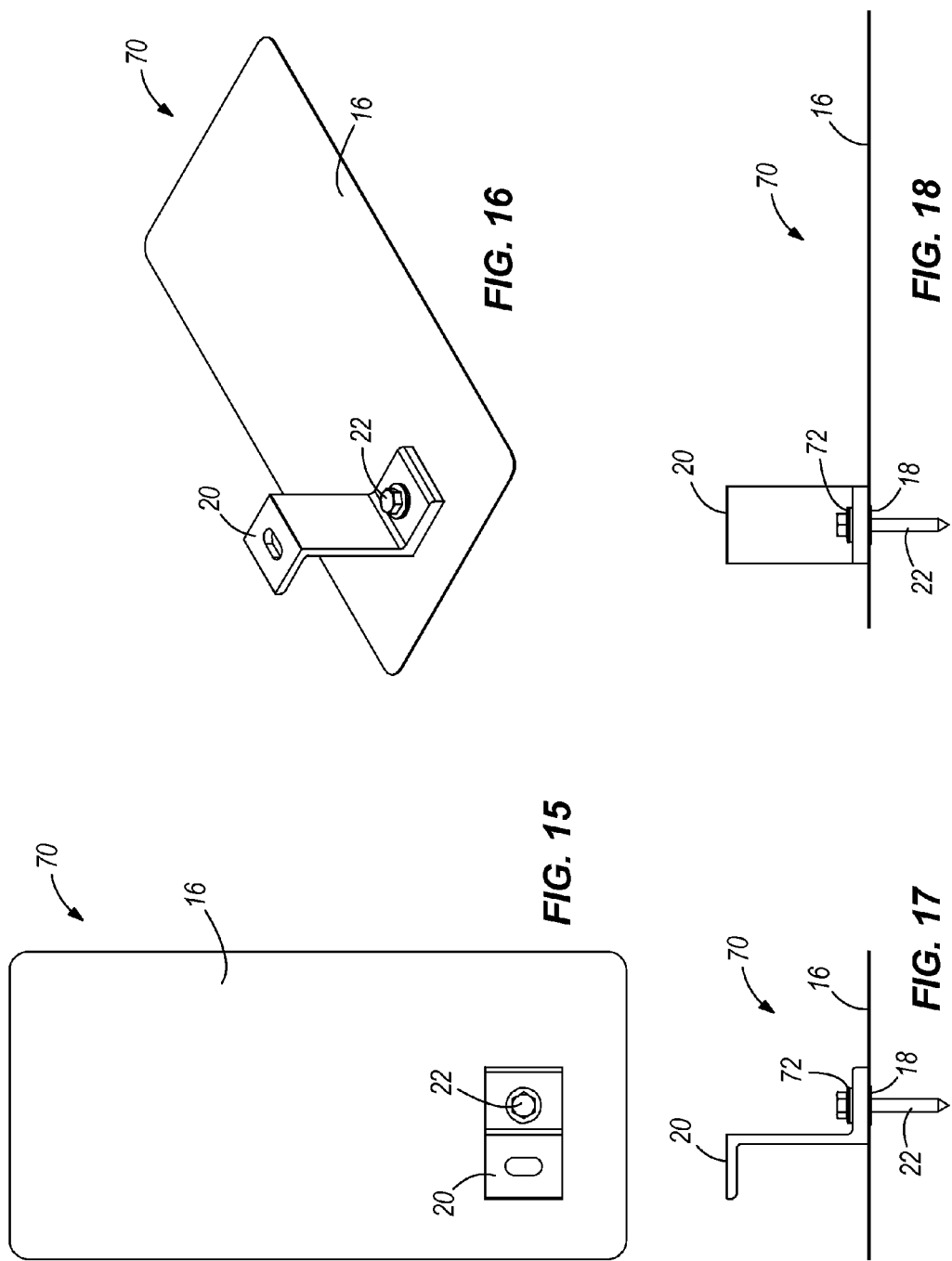

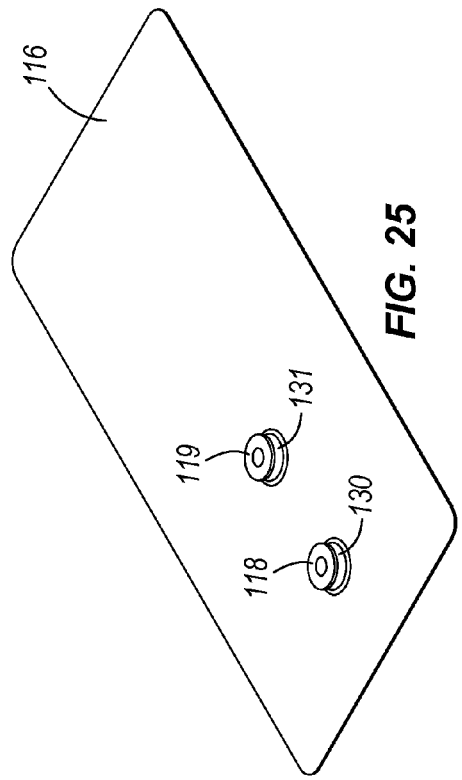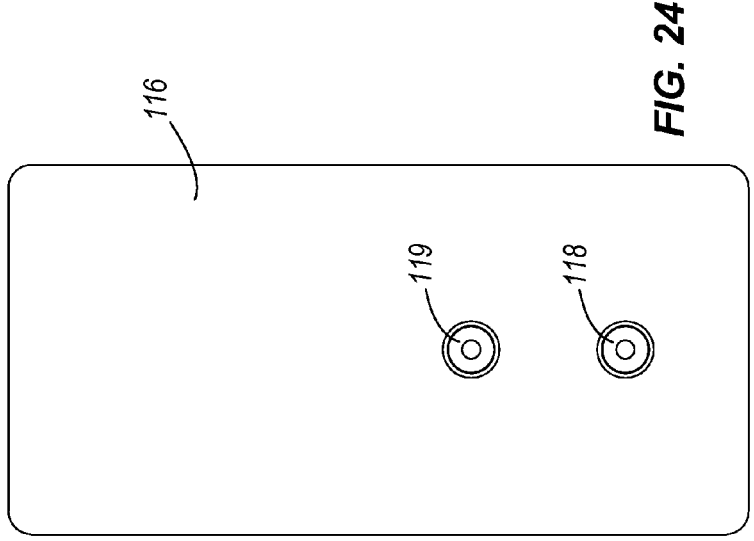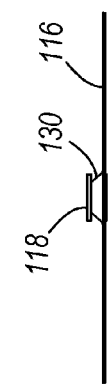

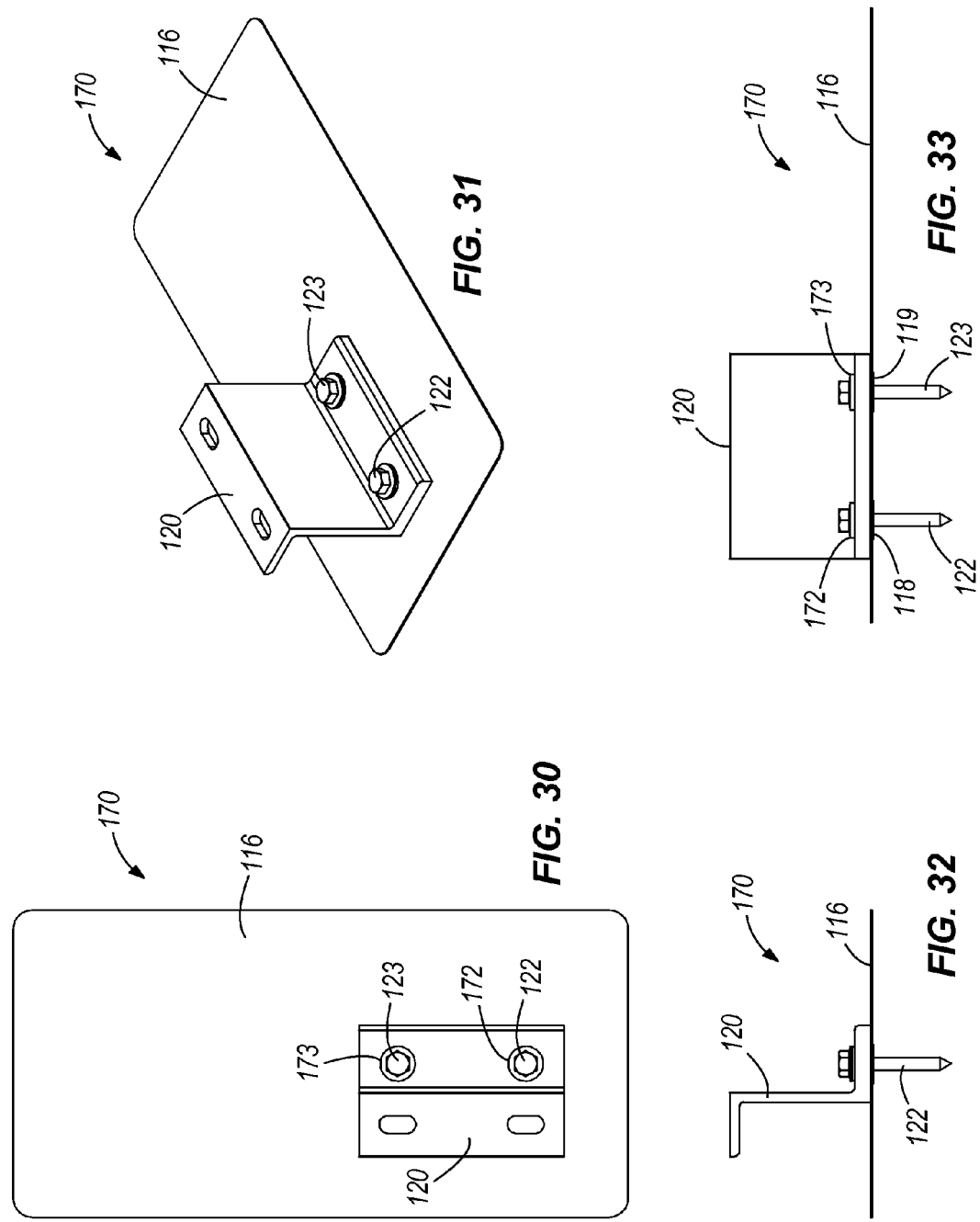

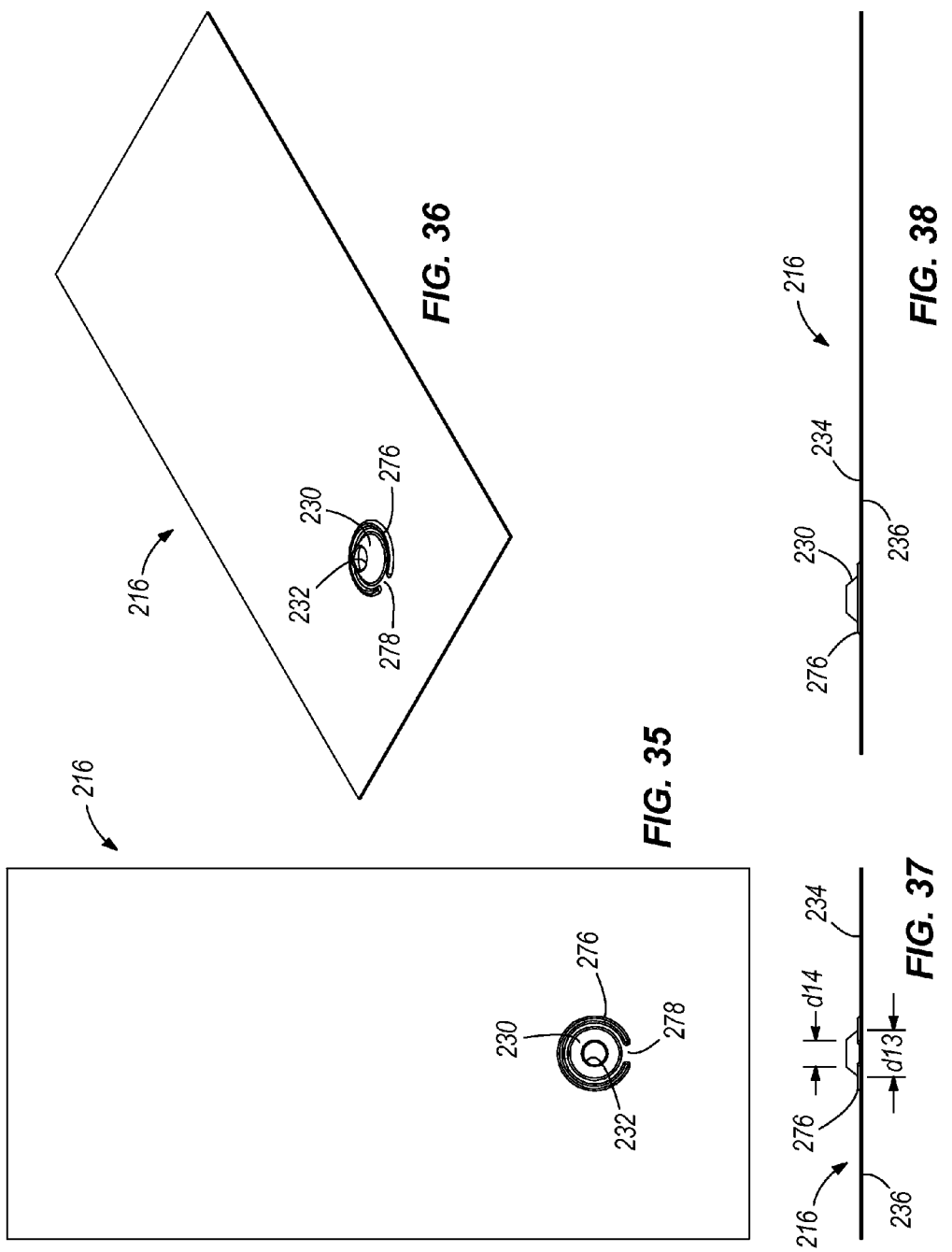

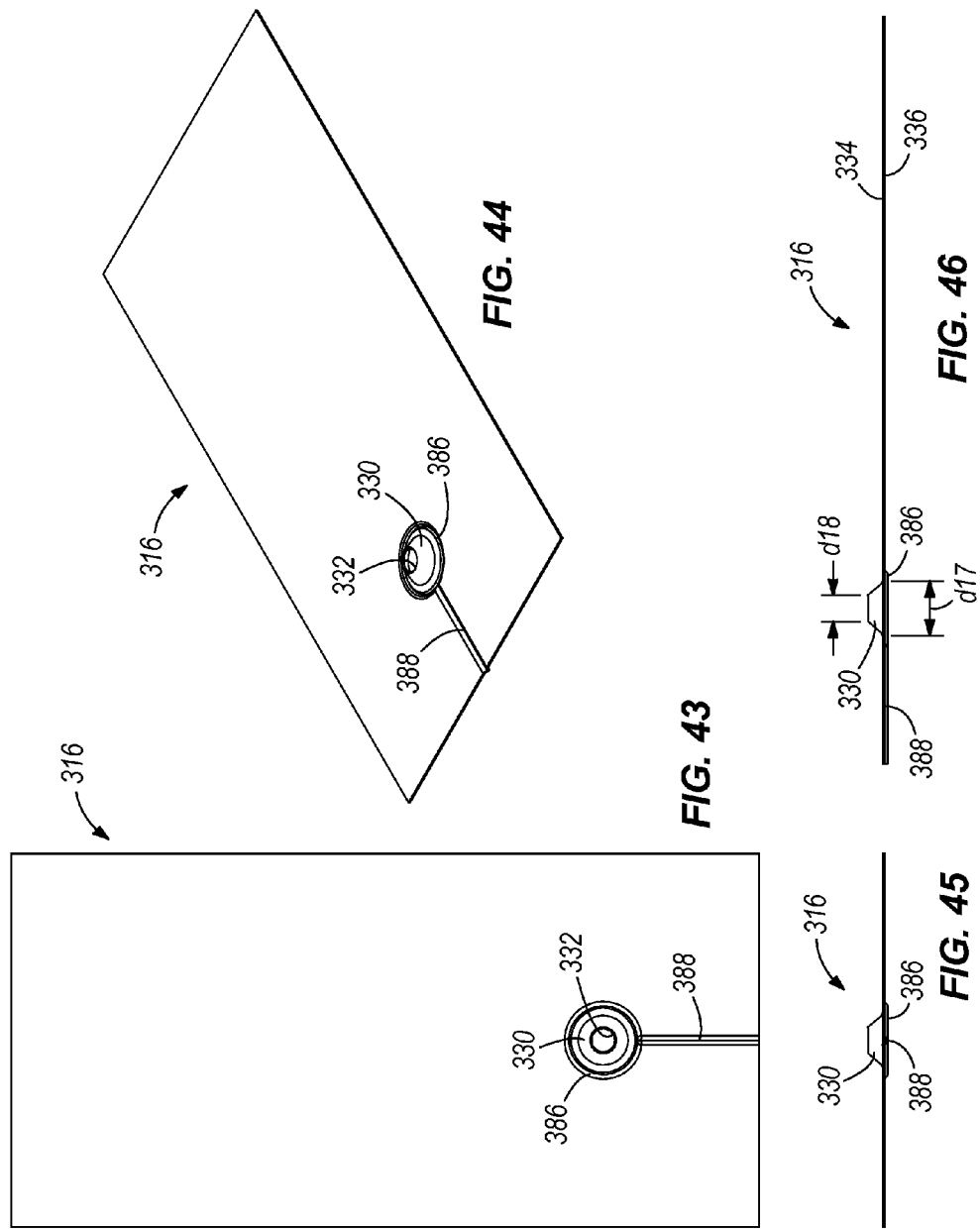

ROOFING SYSTEM AND METHOD

CROSS-REFERENCE TO RELATED APPLICATIONS

The present application claims priority to U.S. Provisional Patent Application No. 61/161,668 filed Mar. 19, 2009, the entire contents of which are herein incorporated by reference.

FIELD OF THE INVENTION

The present invention relates to roofing systems and roof-mounted fixtures and methods for assembling and installing the same.

SUMMARY

The present invention provides a roofing system including a roof substrate and flashing supportable on the roof substrate and including a top surface spaced from the roof substrate, a bottom surface, and an outwardly extending projection having a concave interior side. The flashing can define an aperture extending through the projection between the top surface and the bottom surface. The roofing system can also include a seal for inhibiting fluid entry through the aperture. The seal can extend through the aperture such that the seal contacts at least a portion of the top surface of the flashing and at least a portion of the bottom surface of the flashing. The seal can be conformable with the concave interior side and can define a seal aperture substantially aligned with the flashing aperture. A mounting bracket can be supportable on the flashing and can define an aperture sized to receive at least a portion of each of the seal and the projection. A fastener can extend through the mounting bracket aperture, the seal aperture, and the flashing aperture and can be operable to inhibit fluid flow through the flashing aperture.

In addition, the present invention provides a roofing system including a roof substrate and flashing supportable on the roof substrate. The flashing can include a top surface spaced from the roof substrate, a bottom surface, an outwardly extending projection having a concave interior side and an exterior side forming a frustoconical end, an aperture extending through the projection between the top surface and the bottom surface, and a rim extending outwardly from the flashing and around an outer perimeter of the flashing projection. The roofing system can also include a moisture vent communicating between an interior of the rim and an exterior and a mounting bracket supportable on the flashing and defining an aperture sized to receive at least a portion of the projection. A fastener can extend through the mounting bracket aperture and the flashing aperture to secure the flashing and mounting bracket to the roof substrate.

The present invention also provides a roofing system including a roof substrate and flashing supportable on the roof substrate. The flashing can include a top surface spaced from the roof substrate, a bottom surface, an outwardly extending projection having a concave interior side, and an aperture extending through the projection between the top surface and the bottom surface. A mounting bracket can be supportable on the flashing and define an aperture sized to receive at least a portion of the projection. A recess can extend into one of the top surface of the flashing adjacent to the flashing aperture and a bottom surface of the mounting bracket adjacent to the mounting bracket aperture. At least one of the mounting bracket and the top surface of the flashing can define a moisture vent communicating between the recess and an exterior of the top surface of the flashing. A fastener can extend through the mounting bracket aperture and the flashing aperture to secure the flashing and mounting bracket to the roof substrate.

In addition, the present invention provides a roofing system including a roof substrate and flashing supportable on the roof substrate. The flashing can include a top surface spaced from the roof substrate, a bottom surface, an outwardly extending projection having a concave interior side and an exterior side forming a frustoconical end, and an aperture extending through the projection and communicating between the top and bottom surfaces. A mounting bracket can be supportable on the flashing and can define an aperture sized to receive at least a portion of the projection. A fastener can extend through the mounting bracket aperture and the flashing aperture. The projection can be operable to inhibit fluid flow into the flashing aperture. One of a snow fence, a solar panel, and an antenna component can be secured to the mounting bracket and supported on the roof substrate.

The present invention also provides a roofing system including a roof substrate and a flexible membrane secured to the roof substrate. The roofing system also includes a rigid base positionable between the roof substrate and the flexible membrane and including a top surface spaced from the roof substrate and having an outwardly extending projection having an exterior side forming a frustoconical end, a bottom surface, an aperture extending through the projection and communicating between the top and bottom surfaces, and a tooth extending outwardly from the bottom surface and being engageable with the substrate. The roofing system can also include a mounting bracket supportable on the flexible membrane and defining an aperture sized to receive at least a portion of the projection, a fastener extending through the mounting bracket aperture and the base aperture, and one of a snow fence, a solar panel, and an antenna component secured to the mounting bracket and supported on the roof substrate Some embodiments of the present invention include a roof mounting system having a roof substrate, flashing supportable on the roof substrate and including a top surface spaced from the roof substrate, a bottom surface, and an outwardly extending projection having a concave interior side. The flashing defines an aperture extending through the projection between the top surface and the bottom surface. A seal inhibits fluid entry through the aperture, and the seal extends through the aperture such that the seal contacts at least a portion of the top surface of the flashing and at least a portion of the bottom surface of the flashing. The seal is conformable with the concave interior side and defines a seal aperture substantially aligned with the flashing aperture. A mounting bracket is supportable on the flashing and defines an aperture sized to receive at least a portion of each of the seal and the projection. A fastener extends through the mounting bracket aperture, the seal aperture, and the flashing aperture, such that the seal is operable to inhibit fluid flow through the flashing aperture.

Some embodiments of the present invention include a roof mounting system having a roof substrate, flashing secured to the roof substrate. The flashing includes a first projection and a second projection, the second projection has a substantially frustoconical shape, and the flashing defines a flashing aperture extending through the second projection. A rigid base is positionable between the roof substrate and the flashing and includes a top surface spaced from the roof substrate and having an outwardly extending projection having an exterior side forming a frustoconical end, a bottom surface, an aperture extending through the projection and communicating between the top and bottom surfaces, and a tooth extending outwardly from the bottom surface and being engageable with the substrate. A mounting bracket is supportable on the flashing and defines an aperture sized to receive at least a portion of the projection, and a fastener extends through the mounting bracket aperture, the projection aperture, and the flashing aperture. The projection is operable to inhibit fluid flow through the projection aperture.

Some embodiments of the present invention include a roof mounting system having a roof bracket defining a bracket aperture, the bracket aperture has a generally frustoconical shape, and flashing supportable on the roof substrate and including a top surface spaced from the roof substrate, a bottom surface, and an outwardly extending projection having a concave interior side. The flashing defines an aperture extending through the projection between the top surface and the bottom surface. A seal has a generally frustoconical shape and defines a seal aperture extending therethrough. A fastener is sized to extend through the bracket aperture, the flashing aperture and the seal aperture to couple the roof bracket, flashing and seal to a roof surface. The fastener is positioned to press the roof bracket into abutment with the flashing protrusion and the seal to inhibit flow of fluid through at least one of the bracket aperture, the flashing aperture and the seal aperture.

Other aspects of the invention will become apparent by consideration of the detailed description and accompanying drawings.

BRIEF DESCRIPTION OF THE DRAWINGS

FIG. 9 is a top view of the flashing of FIG. 2 with the seal shown in FIG. 6 installed in the aperture.

FIG. 10 is a perspective view of the flashing and seal shown in FIG. 9.

FIG. 11 is a front view of the flashing and seal shown in FIG. 9.

FIG. 12 is a side view of the flashing and seal shown in FIG. 9.

FIG. 15 is a top view of an assembly including the flashing, the seal, the bracket and a fastener.

FIG. 16 is a perspective view of the assembly shown in FIG. 15.

FIG. 17 is a front view of the assembly shown in FIG. 15.

FIG. 18 is a side view of the assembly shown in FIG. 15.

FIG. 24 is a top view of the flashing shown in FIG. 20 including seals installed in the flashing apertures.

FIG. 25 is a perspective view of the flashing and seals shown in FIG. 24.

FIG. 26 is a front view of the flashing and seals shown in FIG. 24.

FIG. 27 is a side view of the flashing and seals shown in FIG. 24.

FIG. 30 is a top view of an assembly including the flashing, the seals, the bracket and two fasteners.

FIG. 31 is a perspective view of the assembly shown in FIG. 30.

FIG. 32 is a front view of the assembly shown in FIG. 30.

FIG. 33 is a side view of the assembly shown in FIG. 30.

FIG. 35 is a top view of a third embodiment of flashing including one aperture.

FIG. 36 is a perspective view of the flashing shown in FIG. 35.

FIG. 37 is a front view of the flashing shown in FIG. 35.

FIG. 38 is a side view of the flashing shown in FIG. 35.

FIG. 43 is a top view of a fourth embodiment of flashing including one aperture.

FIG. 44 is a perspective view of the flashing shown in FIG. 43.

FIG. 45 is a front view of the flashing shown in FIG. 43.

FIG. 46 is a side view of the flashing shown in FIG. 43.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

Figure 1:
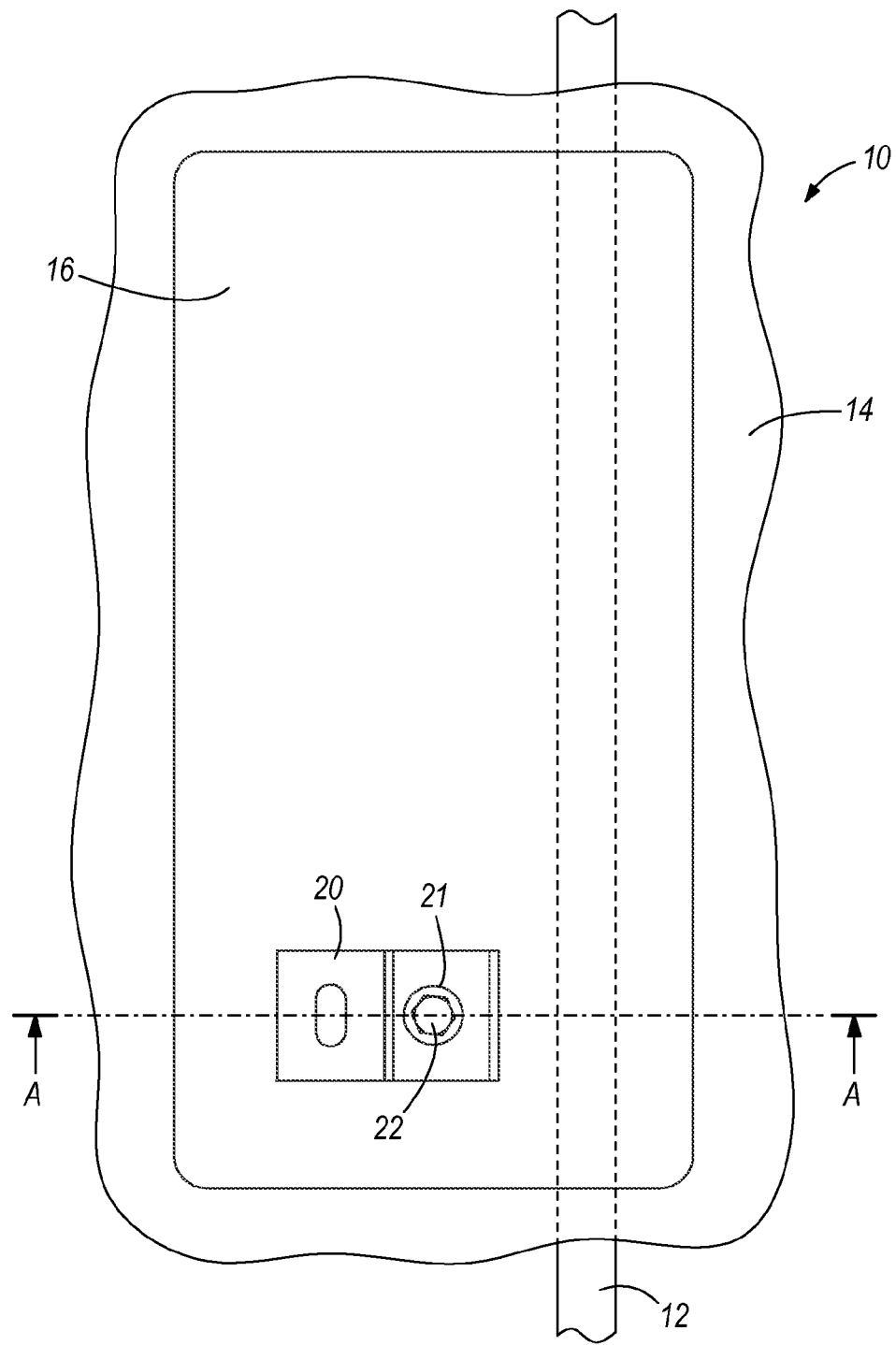
FIG. 1 is a top view of a roofing system according to some embodiments of the present invention.
Figure 1A:
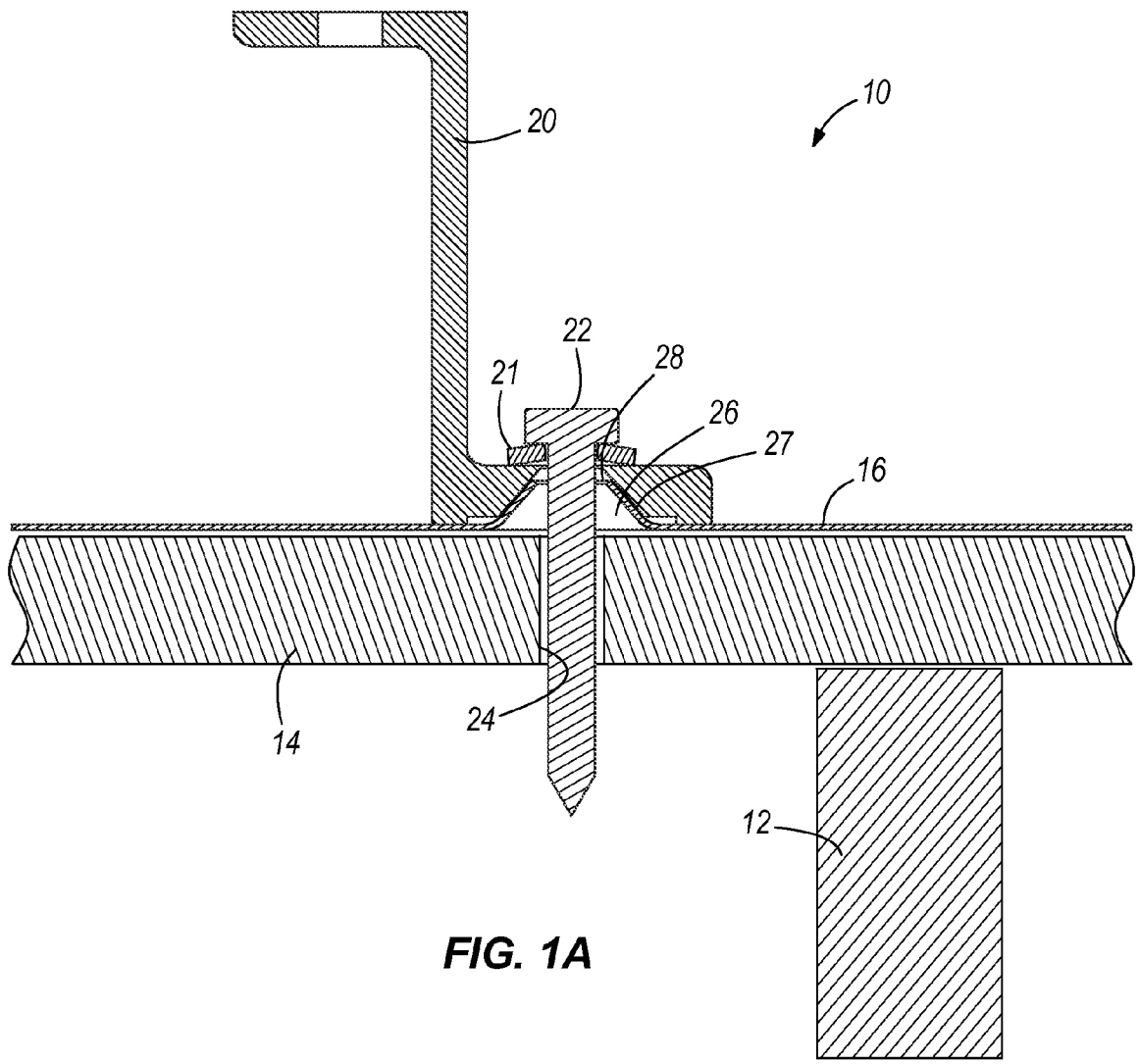
FIG. 1A is a cross-sectional view of the roofing system of FIG. 1, taken along line A-A of FIG. 1.
Figure 3:
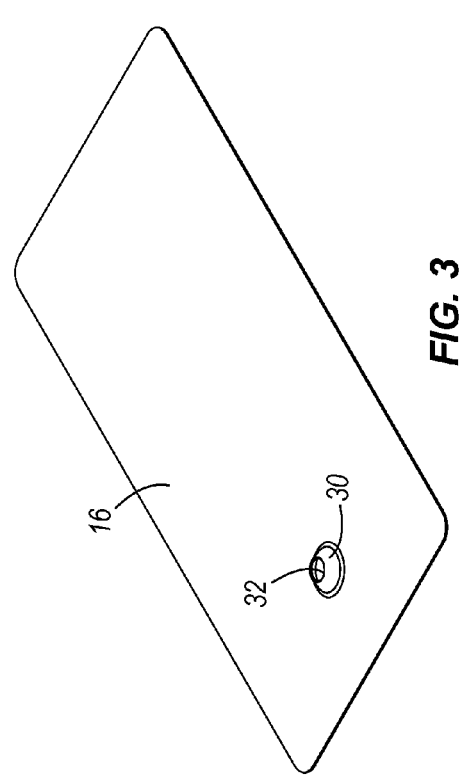
FIG. 3 is a perspective view of the flashing shown in FIG. 2.
Figure 5:
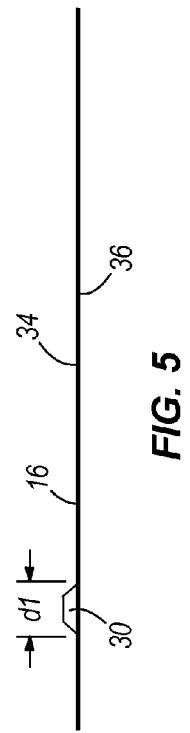
FIG. 5 is a side view of the flashing shown in FIG. 2.
Figure 2:
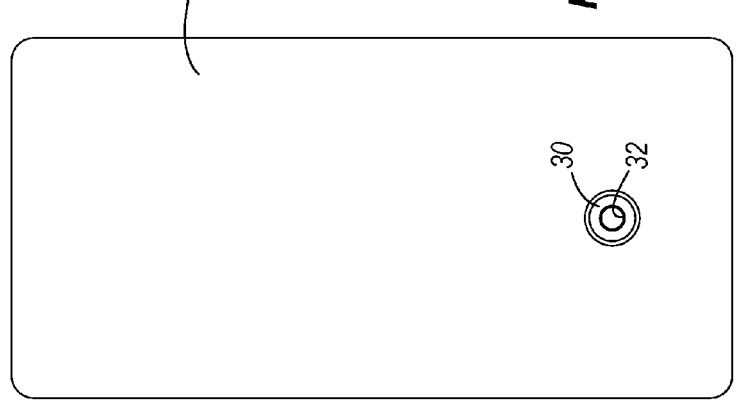
FIG. 2 is a top view of flashing from the roofing system shown in FIG. 1.
Figure 4:
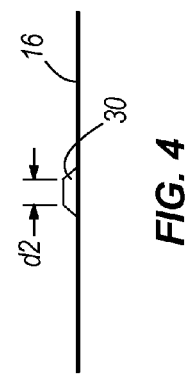
FIG. 4 is a front view of the flashing shown in FIG. 2.

FIGS. 1 and 1A show a roofing system 10 including a number of rafters or beams 12, a roof substrate 14 (e.g., tarpaper, plywood or other decking material, insulation, and the like) supported on the rafters 12, flashing 16 extending across the substrate 14 (i.e., placed immediately adjacent an upper surface of the substrate 14 or supported on one or more intermediate layers of roofing or sealing material, which in turn are placed on the substrate 14), a seal 18, a mounting bracket 20 and at least one fastener 22 operable to connect the bracket 20 to the roof substrate 14 and the flashing 16. In the illustrated embodiment, the roofing system 10 includes a washer 21 positioned between the mounting bracket 20 and the fastener 22. In some embodiments, the washer 21 can be a spring washer, a compression lock washer, a sealing ring or the like. In other embodiments, the washer 21 can be omitted.

The bracket 20 is operable to support any of a variety of roof-mounted assemblies, such as snow guards, snow fences, solar panels, an antenna, signs, billboards, or any other roof-mountable assemblies. Some roof-mounted fixtures are described in detail in commonly-assigned U.S. Pat. Nos. 5,609,326, filed Jun. 16, 1995, and 6,526,701, filed Dec. 6, 2000, the contents of both of which are herein incorporated by reference. Depending on one or more of the geographic location, anticipated quantity and type of precipitation, and anticipated roof and wind loading, the roofing system 10 can include any of a variety of flashing, seal and bracket arrangements 20, as will be discussed below.

Prior to installation of the roofing system 10, apertures 24 are drilled or otherwise created in the rafters 12 and/or substrate 14. The illustrated embodiment shows apertures 24 in the substrate 14. The roofing system 10 inhibits leakage of fluids through the flashing 16, and, in some embodiments, may also or alternately inhibit leakage of fluids beyond the flashing to portions of the substrate 14 or areas below the substrate 14. The roofing system 10 can be utilized on any of a variety of roof types, such as slate roofs, membrane roofs, aluminum roofs, standing seam roofs, tile roofs, shingle roofs, and the like.

A first embodiment of flashing 16 for the roofing system 10 is illustrated in FIGS. 2-5. The flashing 16 of the embodiment of FIGS. 2-5 extends substantially along a plane but includes an upwardly extending protrusion, such as the illustrated projection 30 that tapers upward, out of the plane. The upwardly extending projection 30 has a first diameter $d1$ in the plane, and a second diameter $d2$ in a second plane that is substantially parallel to but spaced from the plane. The second diameter $d2$ is less than the first diameter $d1$, to form a truncated cone or frustoconical shape. In other embodiments, the projections 30 can have other shapes and configurations, corresponding to the shape of an underside of an associated mounting bracket 20.

As best illustrated in FIG. 1A, the projection 30 defines a concave interior side 26, an exterior side 27 and a frustoconical end 28. As used herein, frustoconical includes cones with rounded, flat, non-flat or nearly flat upper portions and truncated cones with rounded, flat, non-flat or nearly flat upper portions. As mentioned above, the projections 30 can have a number of different shapes and configurations. Similarly, in some embodiments, the concave interior side 26 of the projection 30 may have a number of different shapes and configurations, including but not limited to configurations in which the arch provided by the interior side 26 does not include a uniform radius.

The concave interior side 26 and the flashing 16 define a space therebetween. A seal can be positioned within the space to at least partially fill the space to further inhibit leakage through the aperture 24. The seal has been omitted from FIG. 1A for clarity, but is illustrated and described in other figures. Any of the seals shown or described herein can be utilized with the roofing system shown in FIGS. 1 and 1A.

With continued reference to FIGS. 2-5, the upwardly extending projection 30 defines an aperture 32 positioned substantially in the second plane. The illustrated upwardly extending projection 30 and aperture 32 are substantially circular, but in other embodiments, can be square, D-shaped, triangular, pentagonal, hexagonal, ovular, or other regular or irregular shapes. The illustrated aperture 32 is substantially centered on the upwardly extending projection 30, but other, non-centered embodiments are possible. The flashing 16 has a first side 34 and a second side 36 opposite the first side 34. The first side 34 and the second side 36 are substantially planar, apart from the projection 30.

In some embodiments, the aperture 32 is sized to receive a seal 18 therethrough. The seal 18 can extend through the flashing 16, such that the seal 18 engages or contacts the first side 34 of the flashing 16 and the second side 36 of the flashing 16. The illustrated seal 18 includes a first end portion 40 that forms a substantially circular disk having a planar end surface 41 and a second end portion 42 that forms a substantially circular disk having a planar end surface 43 substantially parallel to the planar end surface 41. The illustrated seal 18 also defines a stem, such as the illustrated tapered central portion 44, extending between the first end portion 40 and the second end portion 42. The tapered central portion 44 has a first diameter $d3$ adjacent to the planar end surface 41 and a second diameter $d4$ adjacent to the planar end surface 43. The first diameter $d3$ is less than the second diameter $d4$. The diameter of the tapered central portion 44 increases from the first diameter $d3$ to the second diameter $d4$ substantially linearly to form a taper along a substantially constant angle. The seal 18 has a substantially cylindrical overall shape, with a notch 45 cut out between the first end portion 40 and the second end portion 42 along the tapered central portion 44. The notch 45 is defined by a tapered surface 46 extending between the first and second end portions 40, 42. In the illustrated embodiment, the second diameter d4 is approximately equal to the diameter of the first end portion 40 and the diameter of the second end portion 42.

Figure 7:
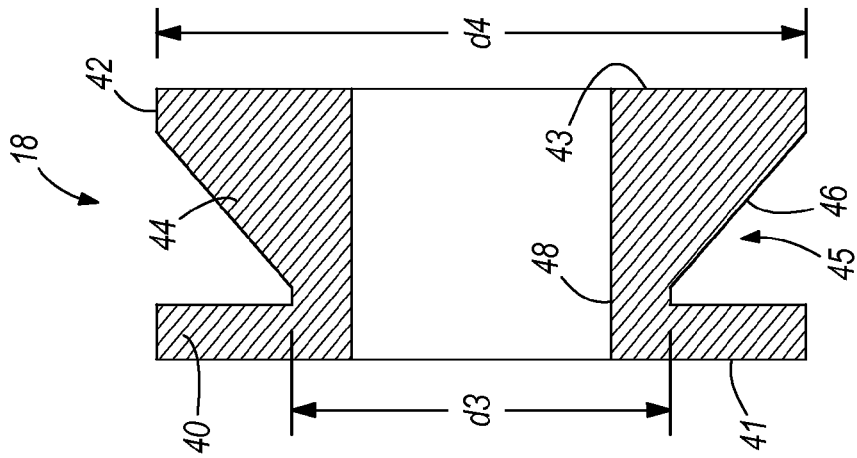
FIG. 7 is a cross-sectional view taken along line 7-7 shown in FIG. 6.

The illustrated seal 18 defines a substantially cylindrical aperture 48 that is substantially centrally located in the seal 18. The aperture 48 extends normal to the outside surfaces of the first and second end portions 40, 42 and parallel to the substantially cylindrical overall shape of the seal 18, in the illustrated embodiment. The aperture 48 has a smaller diameter than the seal first diameter d3, as shown in FIG. 7, so that the seal 18 has an adequate thickness between the first and second end portions 40, 42. The seal 18 can be made from any suitable resilient sealing or electromeric material, such as polymers, rubbers, plastics, and the like.

The seal 18 is insertable into the aperture 32 to couple the seal 18 to the flashing 16, as illustrated in FIGS. 9-12. The notch 45 is sized to receive the flashing 16 therein. The seal 18 is operable to form a compression seal by being held against the concave interior side 26 of the flashing 16. The seal 18 can be factory-installed in the flashing aperture 32 or can be inserted by on-site at a customer's building. A fixture for a punch press can be sized to install the seals 18 into the respective apertures 32. In some embodiments, the punch press can be utilized to form the projection 30 and the aperture 32 in flashing 16, at the same time. In some embodiments, the punch press can form the projection 30 and the aperture 32 in the flashing 16 and then insert the seal 18 into the aperture 32, either during the same operation or during a separate operation.

In some embodiments, a hand tool can be utilized to insert the seal 18 into the aperture 32. This tool can be operated by a single user to press or otherwise urge the first end portion 40 through the aperture 32, such that the projection 30 contacts the tapered surface 46 of the tapered central portion 44. The tool can include one or more fingers to engage the seal 18 and pull or push the seal 18 through the aperture 32. The fingers can be inserted through the aperture 32 from the flashing first side 34 toward the flashing second side 36. The fingers can then squeeze or pinch the first end portion 40 to temporarily reduce the diameter of the first end portion 40. In another embodiment, the fingers can grasp a portion of the first end portion 40. The first end portion 40 is then pulled through the aperture 32. The seal 18 is resilient, such that the seal 18 returns to its previous shape and size after being inserted into the aperture 32.

Figure 6:
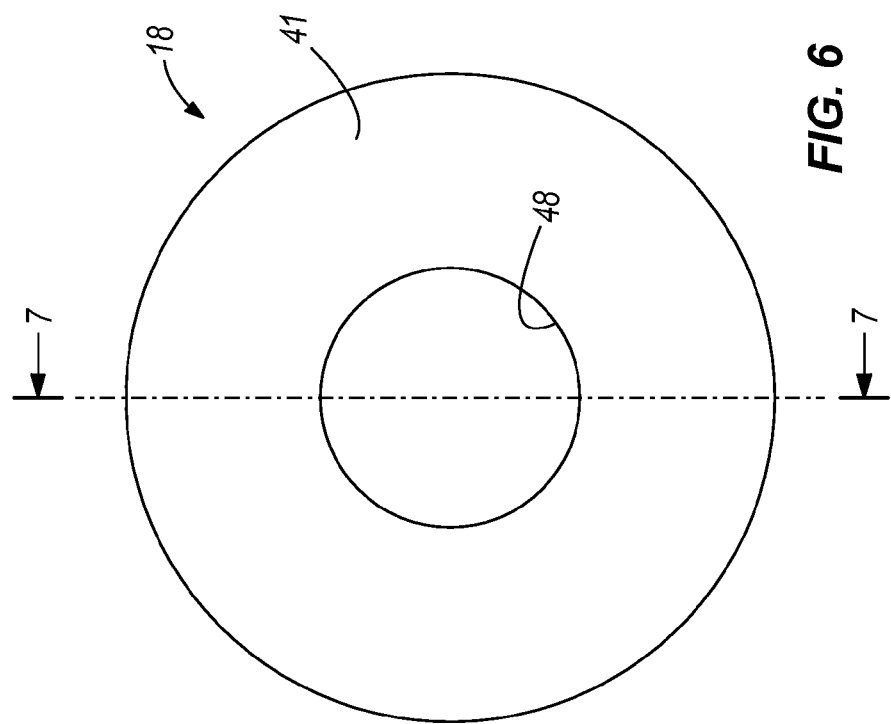
FIG. 6 is a top view of a seal for use with the flashing shown in FIG. 2.
Figure 6A:
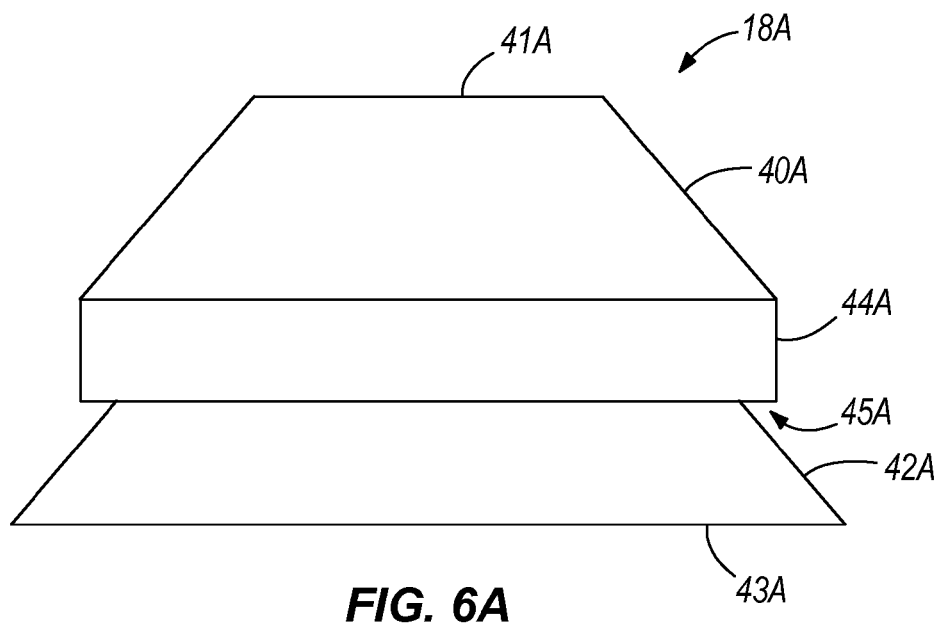
FIG. 6A is a front view of an alternate seal for use with the flashing shown in FIG. 1.

An alternate seal 18A is illustrated in FIGS. 6A-8A. The seal 18A, like seal 18 can extend through the flashing 16 such that the seal 18A engages or contacts the first side 34 of the flashing 16 and the second side 36 of the flashing 16. The illustrated seal 18A includes a first end portion 40A and a second end portion 42A, spaced from the first end portion 40A. The first end portion 40A is tapered from a first diameter dA1 outward to a second diameter dA2, which is greater than the first diameter dA1. The first end portion 40A at the first diameter dA1 has a substantially planar end surface 41A. The illustrated first end portion 40A tapers along a constant slope, but in other embodiments, tapers of varying slope are possible. The second end portion 42A is tapered from a third diameter dA3 inward to a location having a diameter which is less than the third diameter dA3. The second end portion 42A at the third diameter dA3 has a substantially planar end surface 43A, which is substantially parallel to the planar end surface 41A, as shown in FIG. 6A. The illustrated second end portion 42A tapers along a constant slope, but in other embodiments, tapers of varying slope are possible. In the illustrated embodiment, the slope of the first end portion 40A is substantially identical to the slope of the second end portion 42A. In other embodiments, the slope of the first end portion 40A can be greater or less than the slope of the second end portion 42A.

The seal 18A includes a central portion 44A that is positioned between the first end portion 40A and the second end portion 42A. The central portion 44A is substantially disk-shaped and has a substantially constant diameter. In the illustrated embodiment, the central portion 44A has a diameter equal to the second diameter dA2. The central portion 44A extends between the first end portion 40A and the second end portion 42A and defines a notch 45A therebetween. The notch 45A permits the first end portion 40A to be compressed without compressing the second end portion 42A.

Although the illustrated seal 18A does not include an aperture, the seal 18A can define a substantially cylindrical aperture that is substantially centrally located in the seal 18A, similar to the aperture 48 shown in seal 18. The aperture extends normal to the planar end surfaces of the first and second end portions 40A, 42A, in the illustrated embodiment. The aperture can have a smaller diameter than the seal first diameter dA1, so that the seal 18A has an adequate thickness between the first and second end portions 40A, 42A. In some embodiments, the aperture can have a diameter equal to the dA1, such that the first end portion 40A tapers upward toward the aperture. In some such embodiments, the aperture can be formed only when a fastener is inserted through the flashing 16 and the seal 18A during installation of the roofing system 10. In other embodiments, the aperture can be formed in the seal prior to assembly of the roofing system 10. The seal 18A, like seal 18, can be made from any suitable resilient sealing material, such as polymers, rubbers, and the like.

The seal 18A is insertable into the aperture 32 in the flashing 16 to couple the seal 18A to the flashing 16. When installed, the first end portion 40A extends through the aperture 32, such that the flashing 16 is positioned between the first end portion 40A and the second end portion 42A. The notch 45A is sized to receive the flashing 16 therein.

Figure 13:
FIG. 13 is a side view of a bracket for use with the flashing and seal.
Figure 14:
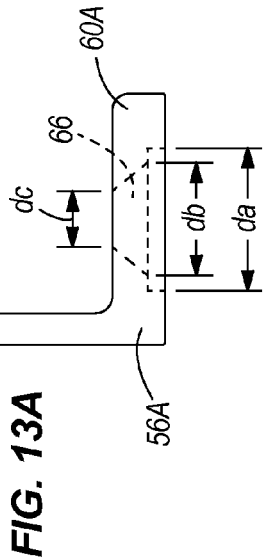
FIG. 14 is a bottom view of the bracket shown in FIG. 13.

A bracket, such as the bracket 20 illustrated in FIGS. 13 and 14, can be coupled to the seal 18 and flashing 16. The illustrated bracket 20 is generally z-shaped and includes an elongate body portion 52 having a first end 54 and a second end 56 spaced from the first end 54. A first flange 58 is coupled to the first end 54 and extends substantially perpendicular to the elongate body portion 52 in a first direction. A second flange 60 is coupled to the second end 56 and extends substantially perpendicular to the elongate body portion 52 in a second direction, opposite the first direction. The first flange 58 defines an aperture 62 extending substantially parallel to the elongate body portion 52. The illustrated aperture 62 is substantially ovular, but other shapes, such as circular, square, rectangular, hexagonal, and the like are possible. The aperture 62 is sized to receive a fastener, protrusion, or the like therethrough. The ovular shape of the aperture 62 permits flexibility and slight relative movement between the bracket 20 and the fastener, projection or the like, when installed.

The second flange 60 of the bracket 20 defines an aperture 64 that includes a first aperture portion 64a and a second aperture portion 64b. The first aperture portion 64a has a substantially cylindrical shape and defines a first diameter d5. The second aperture portion 64b has a substantially cylindrical shape and defines a second diameter d6 that is less than the first diameter d5. The first aperture portion 64a is sized to receive the seal first end portion 40. The second aperture portion 64b is sized to be smaller than the seal first end portion 40 to permit pre-loading of the seal 18, to thereby seal the aperture 64 with the seal 18.

Figure 13A:
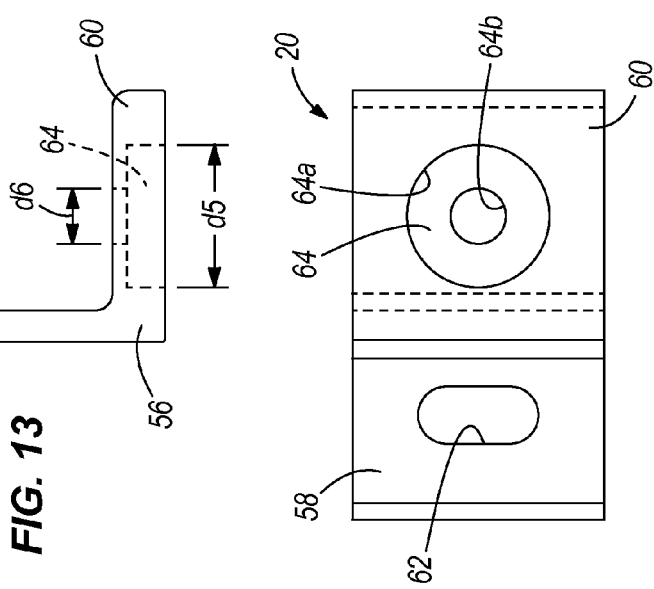
FIG. 13A is a side view of an alternative embodiment of the bracket.
Figure 14A:
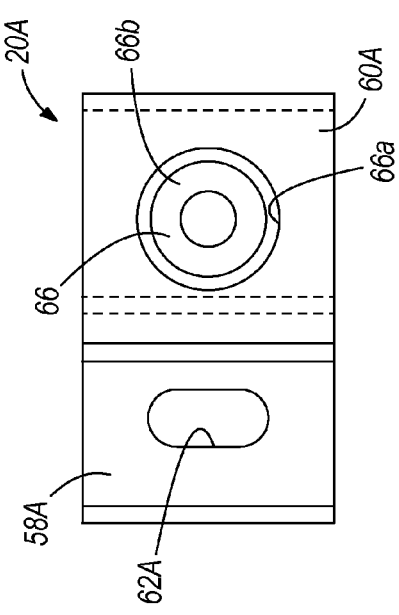
FIG. 14A is a bottom view of the bracket shown in FIG. 13A.
Figure 19:
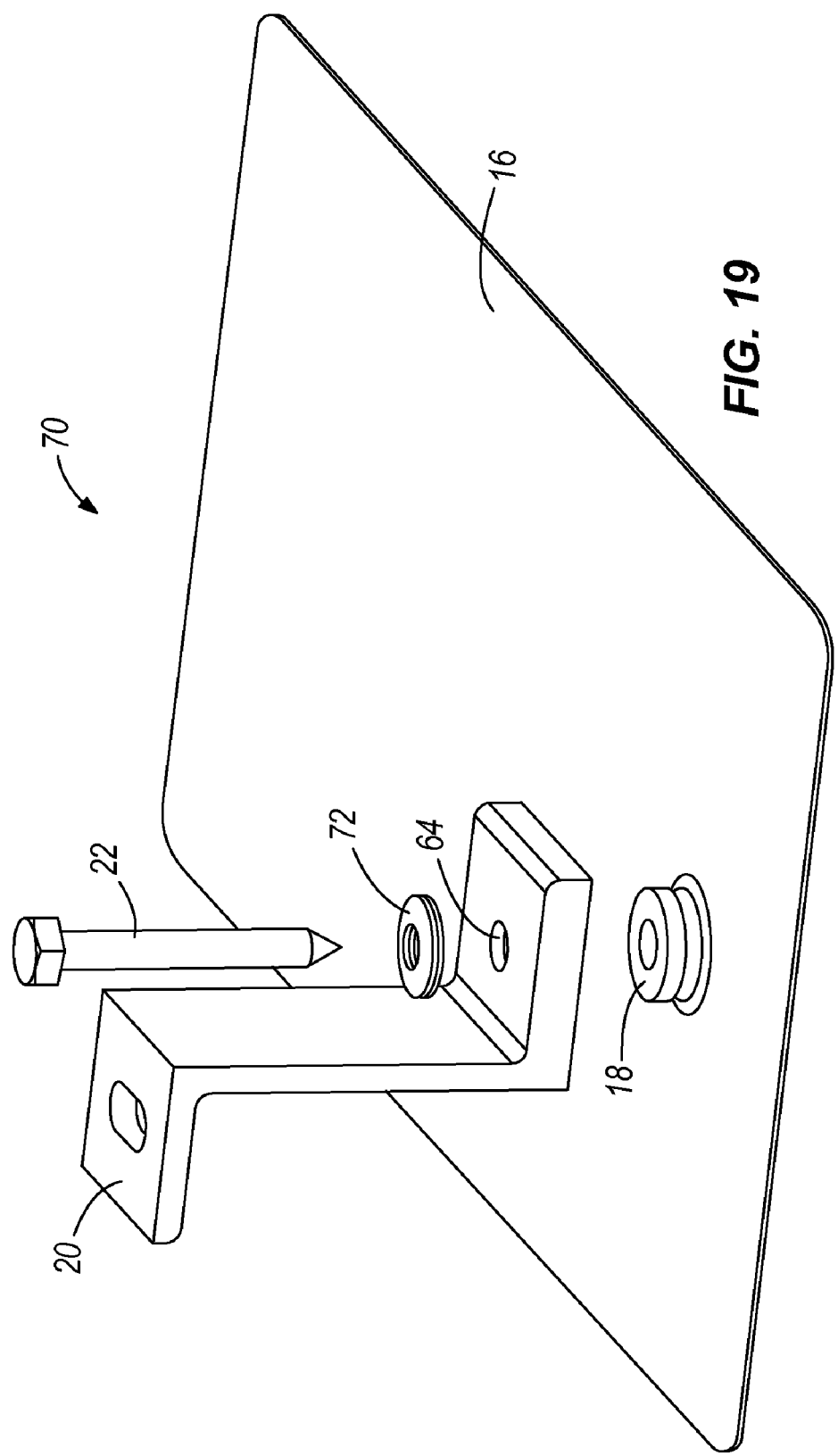
FIG. 19 is an exploded view of the assembly shown in FIG. 15.
Figure 20:
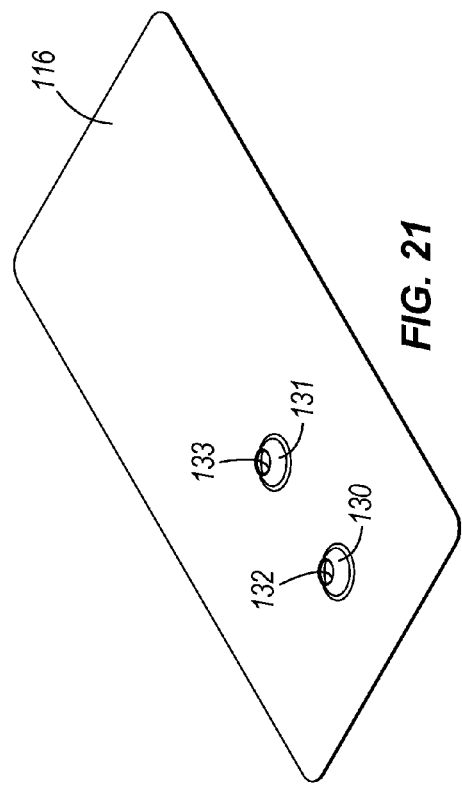
FIG. 20 is a top view of a second embodiment of flashing according to the present invention.
Figure 21:
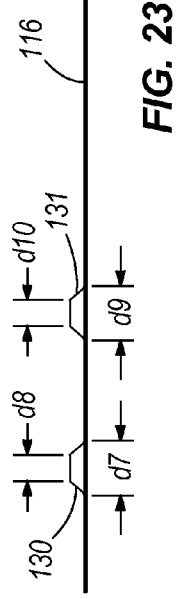
FIG. 21 is a perspective view of the flashing shown in FIG. 20.
Figure 22:
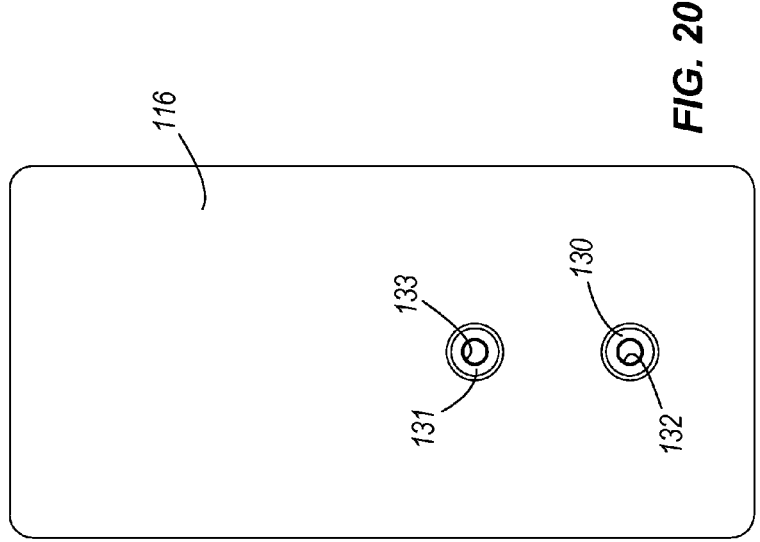
FIG. 22 is a front view of the flashing shown in FIG. 20.
Figure 23:
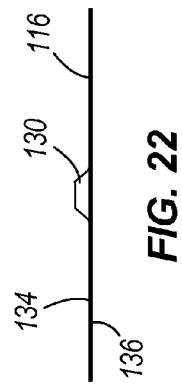
FIG. 23 is a side view of the flashing shown in FIG. 20.

An alternate embodiment of the bracket 20A is shown in FIGS. 13A and 14A. The bracket 20A differs from the bracket 20 in that the second flange 60A includes an aperture 66. The aperture 66 includes a first aperture portion 66a and a second aperture portion 66b. The first aperture portion 66a has a substantially constant diameter da. The second aperture portion 66b has a variable, tapering diameter starting at diameter db, which is less than da and tapering inward to diameter dc. Diameter dc is less than either da or db. The second aperture portion 66b has a substantially constant slope at which the diameter changes between db and dc. In some embodiments, the aperture 66 is tapered along the entire distance between da and dc. In other embodiments, diameters da and db are substantially equal. In still other embodiments, the slope of the tapered portion 66b is greater or less than the illustrated slope. In yet other embodiments, the relative heights of the first aperture portion 66a and the second aperture portion 66b are variable.

Figure 7A:
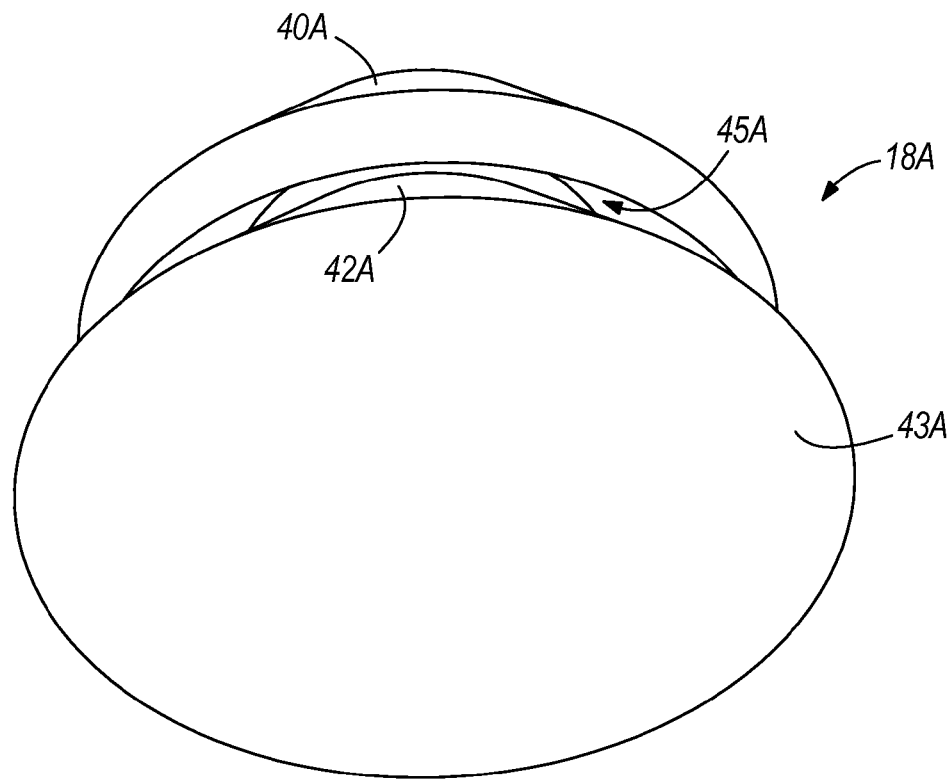
FIG. 7A is a bottom perspective view of the seal shown in FIG. 6A.
Figure 8:
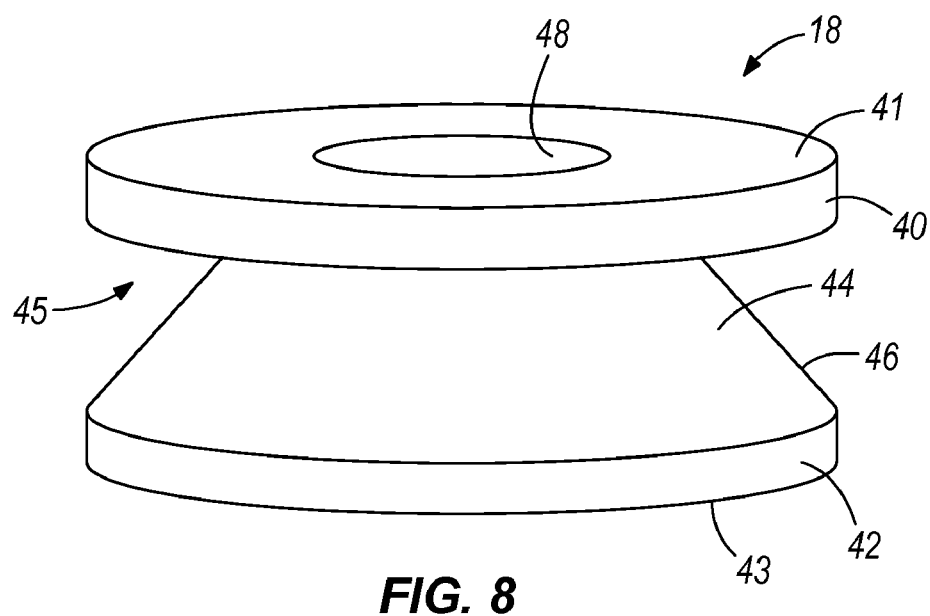
FIG. 8 is a perspective view of the seal shown in FIG. 6.
Figure 8A:
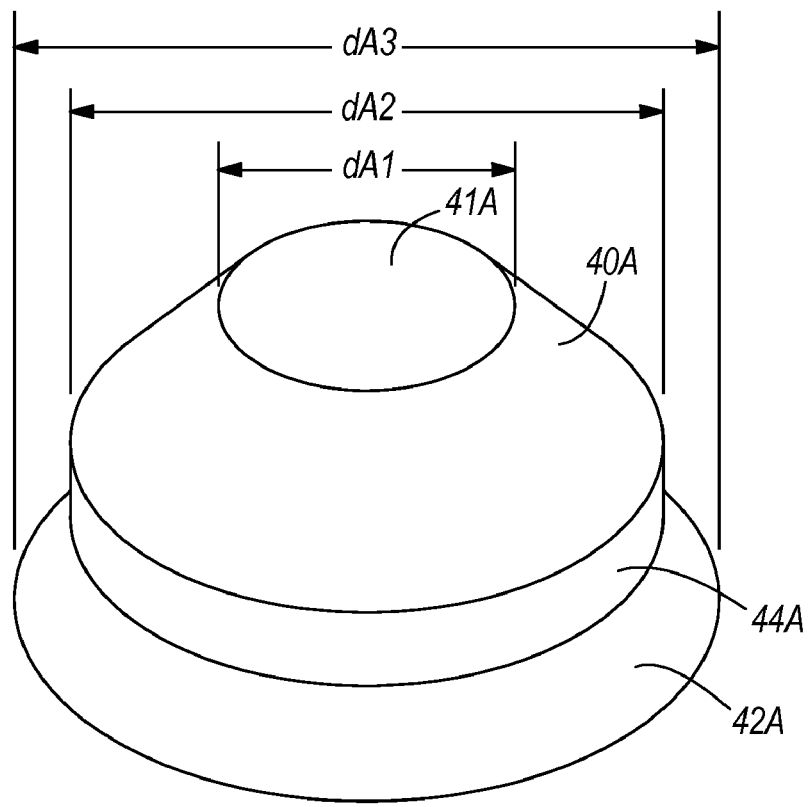
FIG. 8A is a top perspective view of the seal shown in FIG. 6A.

The projection 30 in the flashing 16 is sized to receive the second end portion 42A, as discussed above. The aperture 66 is sized to receive the seal 18A and at least partially pre-load the seal 18A to enhance the seal between the seal 18 and the bracket 20A. In some embodiments, a differently shaped seal can be utilized. One such seal 18A is illustrated in FIGS. 6A and 7A. The seal 18A is sized to substantially mate with the aperture 66, such that the aperture 66 can slightly pre-load the seal 18A. The first aperture portion 66a is sized to receive the central portion 44A, such that da is substantially equal to or slightly less than dA2. In some embodiments, the central portion 44A can be slightly tapered to permit insertion into the first aperture portion 66a when da is slightly less than dA2. The aperture portion 66b is sized to receive the first end portion 40A, such that dc is substantially equal to or slightly less than dA1, and db is substantially equal to or slightly less than dA2. In embodiments where dc and db are slightly less than dA1 and dA2, respectfully, slight pre-loading occurs when the seal 18A is pressed into the aperture 66. In embodiments where dc and db are substantially equal to dA1 and dA2, respectfully, the seal 18A can be preloaded by pressing the seal 18A into the bracket 20A by use of a fastener and the shape and size of the projection 30 in the flashing 16.

The seals 18 and 18A can be inserted into either or both apertures 64 or 66, and other configurations and arrangements of seals and apertures can be utilized to achieve the desired seal between the flashing 16 and the bracket 20 or 20A.

One or more fasteners can be used to couple the bracket 20 to the seal 18 and flashing 16 to form a roofing assembly. One such assembly 70 is illustrated in FIGS. 15-19 and includes the flashing 16, the seal 18, the bracket 20, one fastener 22, and a washer 72. The washer 72 can be a polymeric compression washer to provide a substantially water-tight seal between the fastener 22 and the bracket aperture 64. In some embodiments, the washer 72 can be omitted or can be replaced by an o-ring or an applied sealant, such as caulk. Alternatively or in addition, the washer 72 can include a stiffening element, such as, for example, a rigid backing, to provide additional support.

The assembly 70 can be installed on a roof. The fastener 22 can extend through the flashing 16, the seal 18, the bracket 20, into the substrate 14 and the rafters 12, as illustrated in FIGS. 1 and 1A. The washer 72 and the seal 18 work together to prevent or inhibit entry of water or other fluid into the aperture 64 or to the rafters 12 and/or substrate 14. Even though the illustrated fasteners are bolts, other fasteners, such as screws, studs, nails, and other removable and non-removable fasteners, can be used.

A similar assembly can be formed with the seal 18A and the bracket 20A. This assembly can also include a fastener 22 and a washer 72, as described above. The seals 18, 18A can be used interchangeably with brackets 20, 20A, and other shapes and arrangements of seals and brackets are possible.

FIGS. 20-34 illustrate another embodiment of a roofing system 110 according to the present invention. This embodiment employs much of the same structure and has many of the same properties as the embodiments of the roofing system 10 described above in connection with FIGS. 1-19. Accordingly, the following description focuses primarily upon structure and features that are different than the embodiments described above in connection with FIGS. 1-19. Reference should be made to the description above in connection with FIGS. 1-19 for additional information regarding the structure and features, and possible alternatives to the structure and features of the roofing system 110 illustrated in FIGS. 20-34 and described below. Features and elements in the embodiment of FIGS. 20-34 corresponding to features and elements in the embodiments described above in connection with of FIGS. 1-19 are numbered in the 100 series of reference numbers.

The second flashing 116 is substantially in the shape of a rectangular sheet having rounded corners. The flashing 116 extends substantially along a plane but includes a first upwardly extending projection 130 that tapers upwardly, out of the plane. The first upwardly extending projection 130 has a first diameter d7 in the plane, and a second diameter d8 in a second plane that is substantially parallel to but spaced from the plane. The second diameter d8 is less than the first diameter d7, to form a truncated cone or frustoconical shape. The diameters d7 and d8 can be the same as or different than the diameters d1 and d2 of the projection 30 described above.

The primary difference between the roofing system 110 embodiment illustrated in FIGS. 20-34 and the roofing system embodiment 10 illustrated in FIGS. 1-19 is that the roofing system 110 includes a second upwardly extending projection 131 in the flashing 116. The second upwardly extending projection 131 has a first diameter d9 in the plane, and a second diameter d10 in a second plane that is substantially parallel to but spaced from the plane. The second diameter d10 is less than the first diameter d9, to form a truncated cone or frustoconical shape. The diameters d9 and d10 can be the same as or different than the diameters d7 and d8 of the first projection 130 described above.

Each of the upwardly extending projections 130, 131 defines an aperture 132, 133 positioned substantially in the second plane. The illustrated projections 130, 131 are substantially the same size and shape as the projection 30, but can have different shapes and configurations. Alternatively, each of the projections 130, 131 can have a different shape or configuration so as to require the corresponding mounting bracket 120 to be installed in a specific desired orientation relative to the flashing 116. The illustrated upwardly extending projections 130, 131 and respective apertures 132, 133 are circular, but in other embodiments, can be square, triangular, pentagonal, hexagonal, ovular, or other regular or irregular shapes. The illustrated apertures 132, 133 are substantially centered on the respective upwardly extending projections 130, 131, but other, non-centered embodiments are possible. The second flashing 116 has a first side 134 and a second side 136 opposite the first side 134. The first side 134 and the second side 136 are substantially planar apart from the projections 130, 131.

First and second seals 118, 119 can be inserted into respective apertures 132, 133, as described above and as illustrated in FIGS. 24-27. In other embodiments, a seal similar to seal 18A can be inserted into the flashing 116. Other aperture 132, 133 and seal configurations are possible and are considered to be within the scope of the present invention. The seals 118, 119 can be inserted into the respective apertures 132, 133 as discussed above, such as with a punch press, a hand tool, or the like.

Figure 28A:
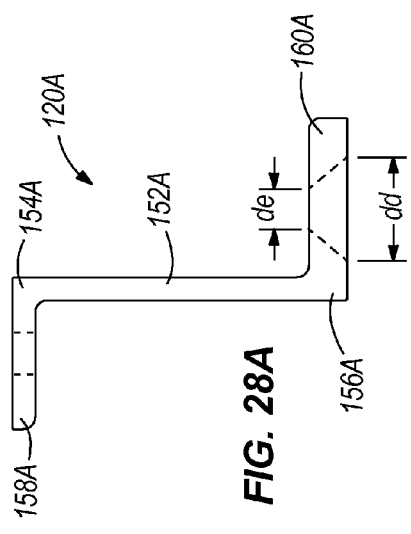
FIG. 28A is a side view of an alternate embodiment of the bracket.
Figure 29A:
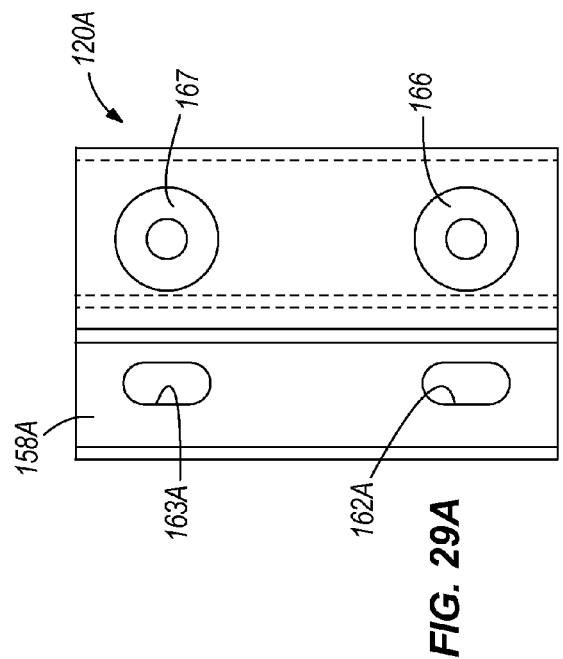
FIG. 29A is a bottom view of the bracket shown in FIG. 28A.
Figure 28:
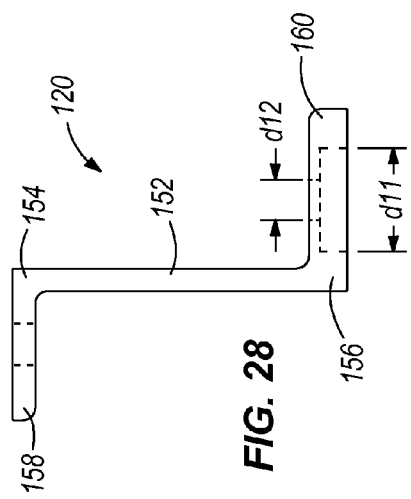
FIG. 28 is a side view of a bracket for use with the flashing and seals shown in FIG. 24.
Figure 29:
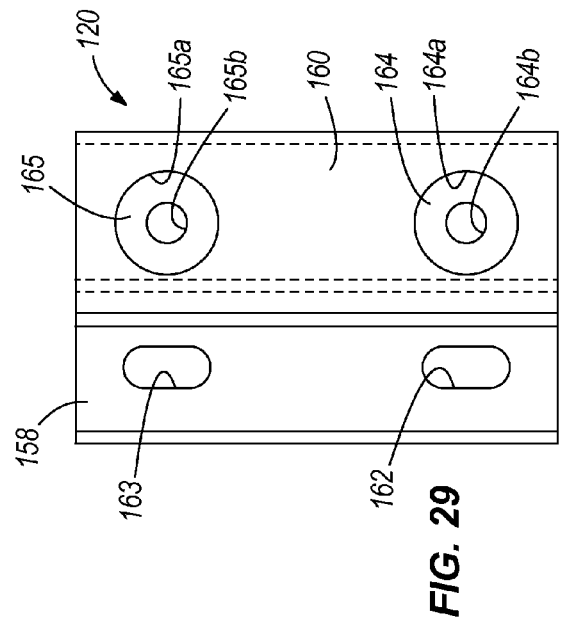
FIG. 29 is a bottom view of the bracket shown in FIG. 28.
Figure 34:
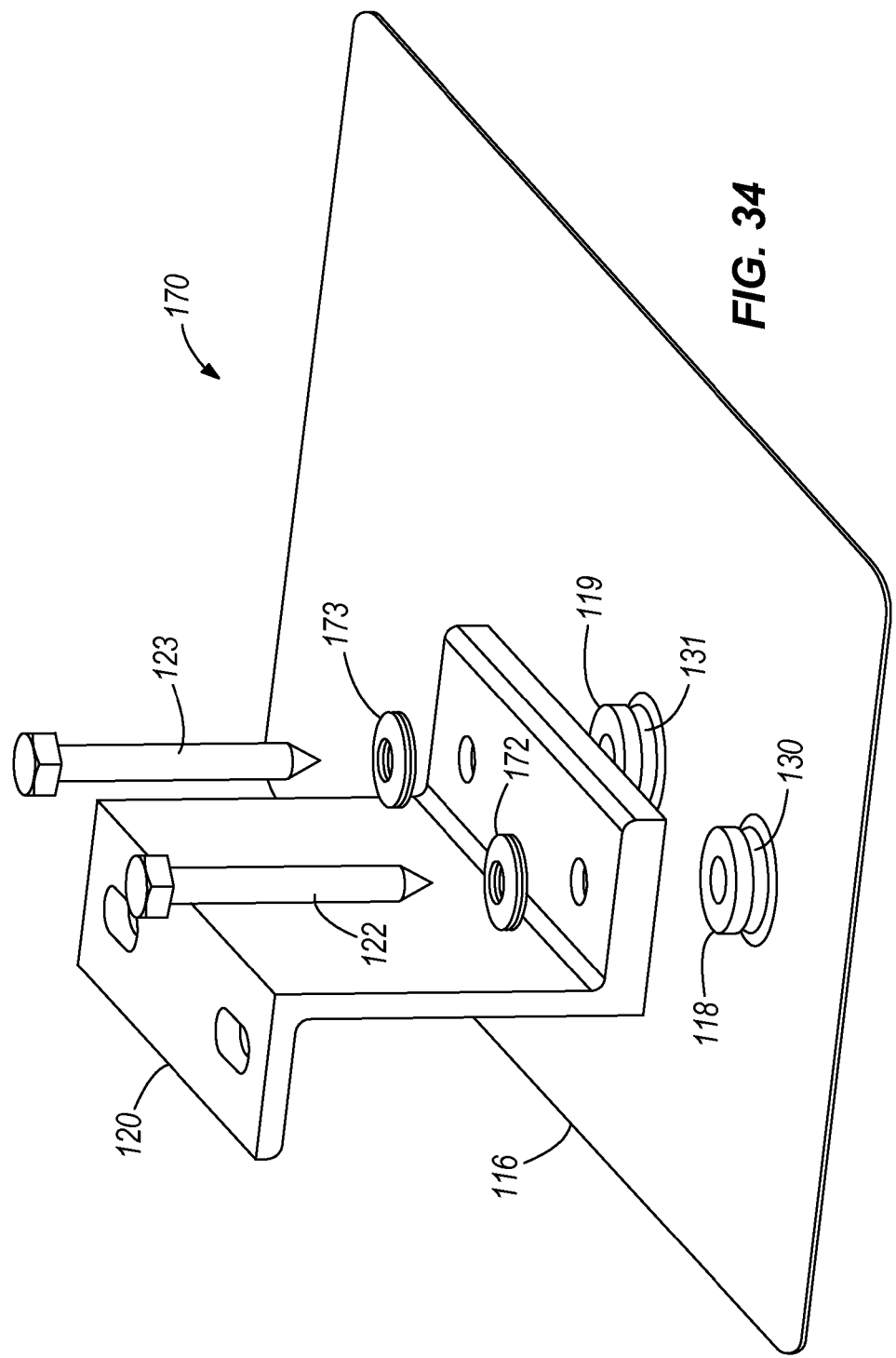
FIG. 34 is an exploded view of the assembly shown in FIG. 30.

A bracket, such as the bracket 120 illustrated in FIGS. 28 and 29, can be coupled to the seals 118, 119 and flashing 116. The illustrated bracket 120 is generally z-shaped and includes an elongate body portion 152 having a first end 154 and a second end 156 spaced from the first end 154. A first flange 158 is coupled to the first end 154 and extends substantially perpendicular to the elongate body portion 152 in a first direction. A second flange 160 is coupled to the second end 156 and extends substantially perpendicular to the elongate body portion 152 in a second direction, opposite the first direction. The first flange 158 defines a pair of apertures 162, 163 extending substantially parallel to the elongate body portion 152. The illustrated apertures 162, 163 are substantially ovular, but other shapes, such as circular, square, rectangular, hexagonal, and the like are possible. The apertures 162, 163 are sized to receive a fastener, projection, or the like therethrough. The ovular shape of the apertures 162, 163 permits flexibility and slight relative movement between the bracket 120 and the fastener, projection or the like, when installed.

The second flange 160 of the bracket 120 defines a first aperture 164 that includes a first aperture portion 164a and a second aperture portion 164b. The second flange 160 of the bracket further defines a second aperture 165 that includes a first aperture portion 165a and a second aperture portion 165b. The first aperture portions 164a, 165a have a substantially cylindrical shape and define a first diameter d11. The second aperture portions 164b, 165b have a substantially cylindrical shape and define a second diameter d12 that is less than the first diameter d11. The first aperture portions 164a, 165a are sized to receive the seal 118. The second aperture portions 164b, 165b are sized to be smaller than the seal 118, to permit pre-loading of the seal 118, to thereby seal the aperture 164 with the seal 118.

The apertures 164, 165 can have the same shape and size as aperture 64, or can be larger than or smaller than the aperture 64. First aperture portions 164a, 165a can have different diameters to denote proper orientation of the bracket 120 on the flashing 116. Other configurations and arrangement of brackets and apertures are possible and are considered to be within the scope of the present invention.

An alternate embodiment of the bracket 120A is shown in FIGS. 28A and 29A. The bracket 120A is similar to the bracket 120 shown in FIGS. 28 and 29, such that items include the indicator "A" to denote the similarity. The bracket 120A differs from the bracket 120 in that the second flange 160A includes apertures 166 and 167. The apertures 166, 167 have a variable, tapering diameter starting at diameter dd, and tapering inward to diameter de. Diameter dc is less than da. The apertures 166, 167 have a substantially constant slope at which the diameter changes between da and dc. In some embodiments, the apertures 166, 167 are tapered along only a portion of the distance between da and dc. In still other embodiments, the slopes of the respective apertures 166, 167 are greater or less than the illustrated slope. The apertures 166, 167 can have the same diameters dd, de or can have different diameters and/or different slopes.

The apertures 166, 167 are sized to receive a seal similar to seal 18A, illustrated in FIGS. 6A-8A, and at least partially pre-loading the seal 18A to enhance the seal between the seal 18 and the bracket 20A. In some embodiments, a differently shaped seal can be utilized. The seals 118, 119 or other similar seals can be inserted into either apertures 164, 165 or 166, 165. Other configurations and arrangements of seals and apertures can be utilized to achieve the desired seal between the flashing 116 and the bracket 120 or 120A.

One or more fasteners can be used to couple the bracket 120, 120A to the seals 118, 119 and flashing 116 to form a roofing assembly. One such assembly 170 is illustrated in FIGS. 30-34 and includes the flashing 116, the seals 118, 119, the bracket 120, two fasteners 122, 123 and two washers 172, 173. The washers 172, 173 can be polymeric compression washers to provide a substantially water-tight seal between the fastener 122, 123 and the bracket apertures 164, 165. In some embodiments, the washers 172, 173 can be omitted or can be replaced by an o-ring or an applied sealant, such as caulk.

The assembly 170 can be installed on a roof. The fasteners 122, 123 can extend through the flashing 116, the respective seals 118, 119, the bracket 120, and into rafters or substrate similar to the embodiment illustrated in FIGS. 1 and 1A. The washers 172, 173 and the seals 118, 119 work together to prevent or inhibit entry of water or other fluid into the apertures 164, 165 or the rafters 12 and/or substrate 14. Even though the illustrated fasteners are bolts, other fasteners, such as screws, studs, nails, and other acceptable removable and non-removable fasteners, can be used.

The bracket 120 is operable to support any of a variety of roof-mounted fixtures, such as snow guards, snow fences, solar panels, an antenna, signs, billboards, walkways, pipe lines, mechanical units, signage, screens, cabling or any other assembly mountable to a roof. The inclusion of two projections 130, 131 can be beneficial to inhibit rotation of a bracket 120 while mounted on a roof and/or to define a specific orientation of a bracket 120 relative to the roof. Other bracket configurations and arrangements are possible, and the illustrated bracket 120 is provided by way of example only. In some embodiments, bracket 20 can be coupled to only one projection 130, 131, such that the brackets 20 can have different orientations, and the unused projection can be sealed with other structure.

A similar assembly can be formed with the seal 118A, 119A and the bracket 120A. This assembly can also include a pair of fasteners 122, 123 and washers 172, 173, as described above. The seals 118, 118A, 119, 119A can be used interchangeably with brackets 120, 120A, and other shapes and arrangements of seals and brackets are possible.

FIGS. 35-42 illustrate another embodiment of a roofing system 210 according to the present invention. This embodiment employs much of the same structure and has many of the same properties as the embodiments of the roofing systems 10, 110 described above in connection with FIGS. 1-34. Accordingly, the following description focuses primarily upon structure and features that are different than the embodiments described above in connection with FIGS. 1-34. Reference should be made to the description above in connection with FIGS. 1-34 for additional information regarding the structure and features, and possible alternatives to the structure and features of the roofing system 210 illustrated in FIGS. 35-42 and described below. Features and elements in the embodiment of FIGS. 35-42 corresponding to features and elements in the embodiments described above in connection with of FIGS. 1-34 are numbered in the 200 series of reference numbers.

A third flashing 216 is illustrated in FIGS. 35-39. The third flashing 216 is substantially in the shape of a rectangular sheet having square corners. The flashing 216 extends substantially along a plane but includes a first upwardly extending projection 230 that tapers upwardly, out of the plane. The first upwardly extending projection 230 has a first diameter d13 in the plane, and a second diameter d14 in a second plane that is substantially parallel to but spaced from the plane. The second diameter d14 is less than the first diameter d13, to form a truncated cone or frustoconical shape. The diameters d13 and d14 can be the same as or different than the diameters d1 and d2 of the projection 30 described above.

The first upwardly extending projection 230 defines an aperture 232 positioned substantially in the second plane. The illustrated upwardly extending projection 230 and aperture 232 are circular, but in other embodiments, can be square, triangular, pentagonal, hexagonal, ovular, or other regular or irregular shapes. The illustrated aperture 232 is substantially centered on the upwardly extending projection 230, but other, non-centered embodiments are possible. The third flashing 216 has a first side 234 and a second side 236 opposite the first side 234. The first side 234 and the second side 236 are substantially planar apart from the projection 230.

The third flashing 216 also includes a second upwardly extending projection 276 extending out of the first plane around a majority of the circumference of the first projection 230. The second upwardly extending projection 276 has a substantially curved shape and forms almost a complete ring around the first projection 230. The second projection 276 forms a channel, slit or other similar narrow aperture or path, such as the illustrated slit 278. The slit 278 can be oriented vertically below the upwardly extending projection 276 to provide a pathway for moisture to move away from the projection 230. Moisture can be moved or drawn away from the aperture 232 by at least one of wicking, capillary action, surface tension, gravity, and evaporation. In some embodiments, the slit 278 is positioned on a downhill side of the roof relative to the aperture 232 to utilize gravity to move fluid away from the projection 230. The projection 276 can further direct fluid away from the projection 230 to inhibit leakage of water into the aperture 232. In some embodiments, the slit 278 includes a cutout or downwardly protruding extension to further move fluid away from the projection 230 and aperture 232.

In other embodiments, the first and second projections 230, 276 can be formed together on a second sheet of flashing or other similar material, and the second sheet can then be secured (i.e., welded, brazed, soldered, glued or fastened in another conventional manner) to the flashing 216.

Figure 39:
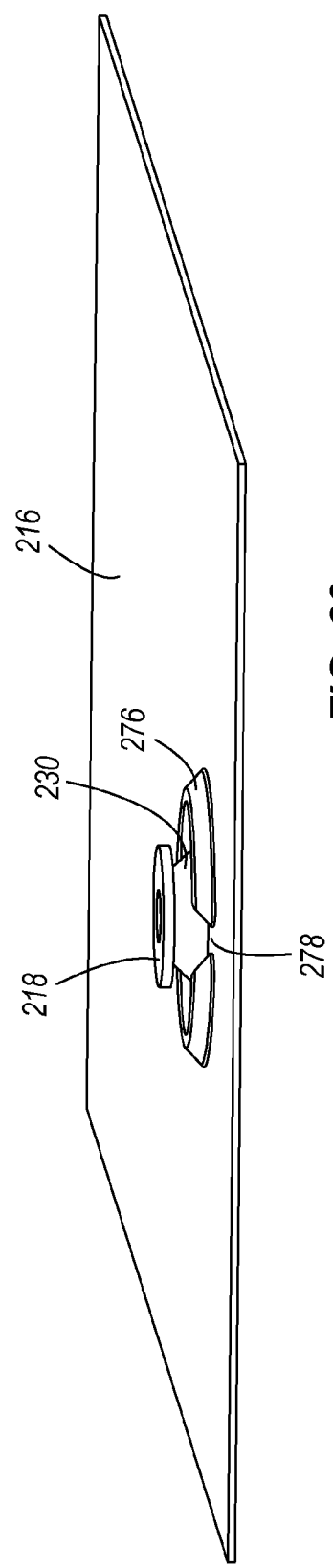
FIG. 39 is a perspective view of the flashing shown in FIG. 35 including the seal shown in FIG. 6.

FIG. 39 illustrates a seal 218 inserted into the aperture 232, similar to the embodiments described above for seals 18 and 118. The seal 218 can contact both the first side 234 and the second side 236 of the flashing 216. The seal 218 can be inserted into the apertures 232 in any of the methods described above. The projection 230, aperture 232, and projection 276 can be formed into the flashing 216 during the same operation or by the same machine as when the seal 218 is inserted into the aperture 232. In other embodiments, the projections 230, 276 and aperture 232 can be formed into the flashing 216 prior to inserting the seal 218 into the aperture 232.

The slit 278 and projection 276 are shown in FIG. 39 more clearly, so as to illustrate the height difference between the flashing plane, the projection 230 and the projection 276. In the instance that fluid would flow over the projection 276 and up the projection 230, seal 218 would inhibit the fluid from entering the aperture 232.

Figure 40:
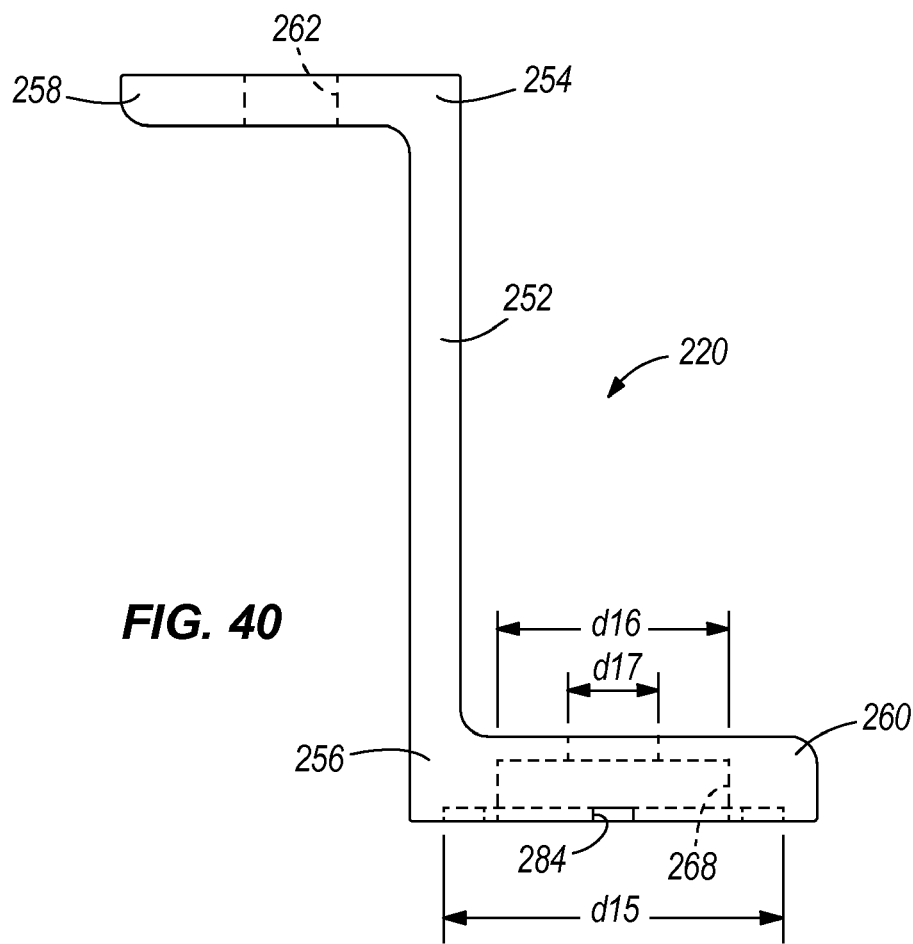
FIG. 40 is a side view of a bracket for use with the flashing and seal shown in FIG. 35.
Figure 41:
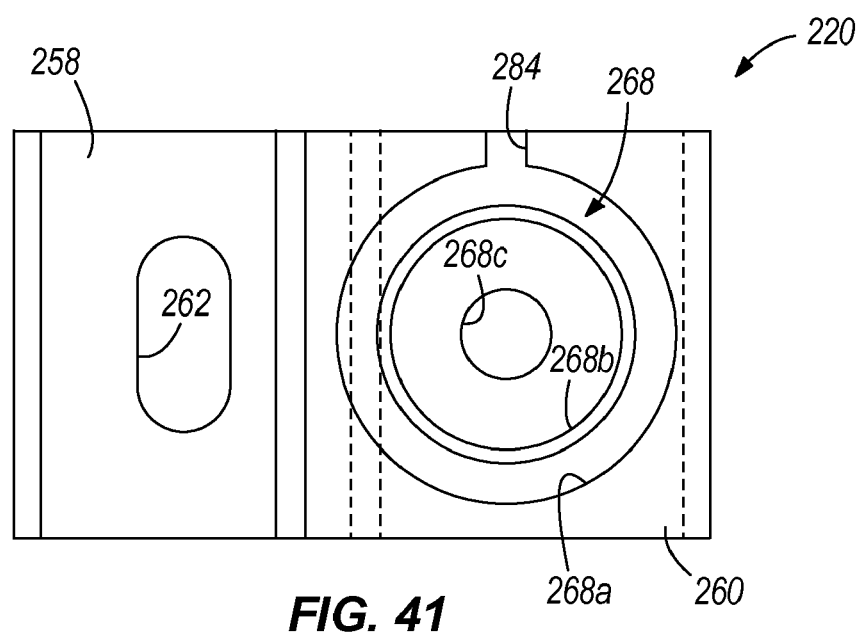
FIG. 41 is a bottom view of the bracket shown in FIG. 40.
Figure 42:
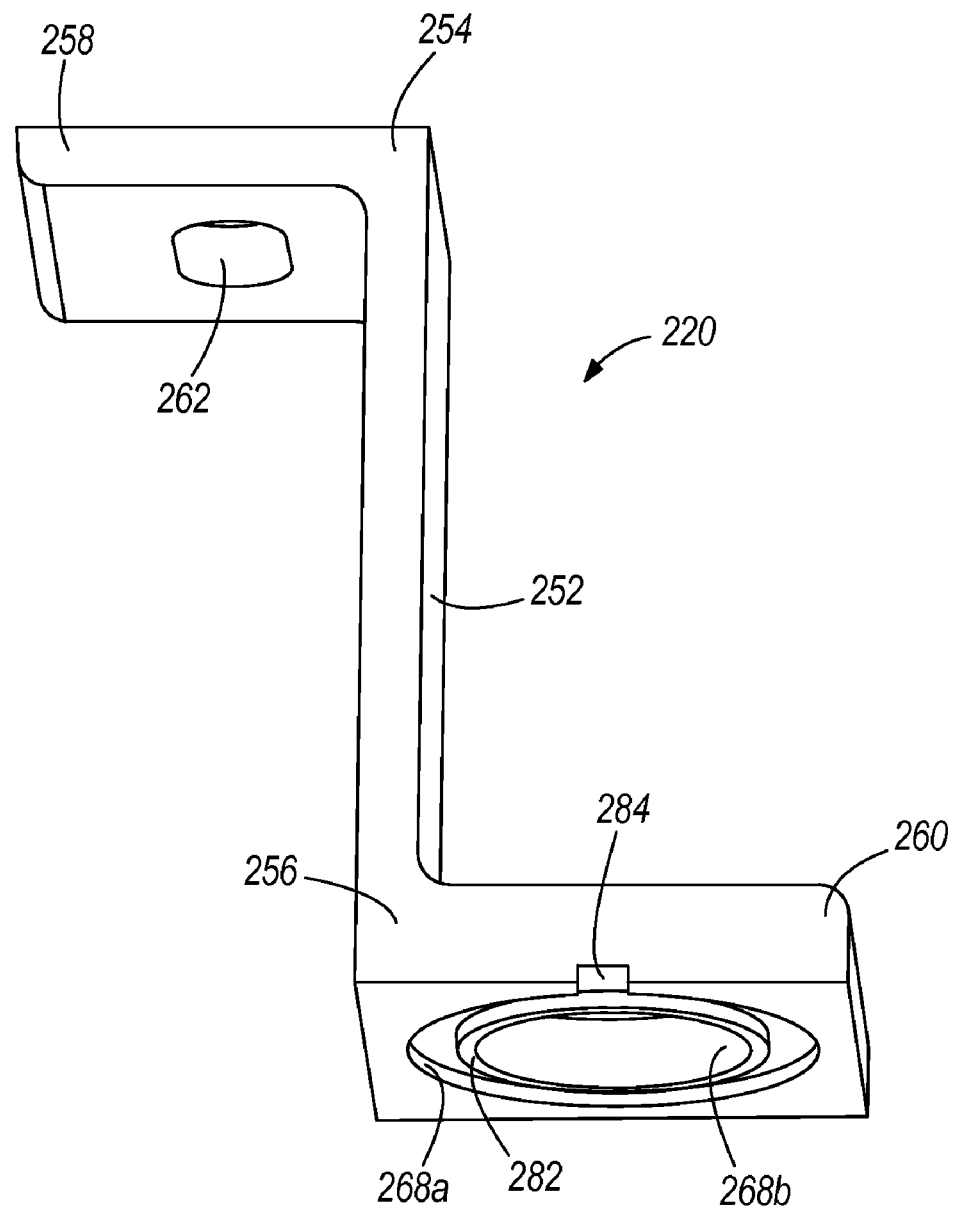
FIG. 42 is a bottom perspective view of the bracket shown in FIG. 40.

The brackets 20, 20A, 120, 120A can be utilized with the embodiment shown in FIGS. 35-42. A bracket 220, as shown in FIGS. 40-42, can be also or alternatively be utilized with the flashing 216. The bracket 220 is generally z-shaped and includes an elongate body portion 252 having a first end 254 and a second end 256 spaced from the first end 254. A first flange 258 is coupled to the first end 254 and extends substantially perpendicular to the elongate body portion 252 in a first direction. A second flange 260 is coupled to the second end 256 and extends substantially perpendicular to the elongate body portion 252 in a second direction, opposite the first direction. The first flange 258 defines an aperture 262 extending substantially parallel to the elongate body portion 252. The illustrated aperture 262 is substantially ovular, but other shapes, such as circular, square, rectangular, hexagonal, and the like are possible. The aperture 262 is sized to receive a fastener, projection, or the like therethrough. The ovular shape of the aperture 262 permits flexibility and slight relative movement between the bracket 220 and the fastener, projection or the like, when installed.

The second flange 260 of the bracket 220 defines an aperture 268 that includes a first aperture portion 268a, a second aperture portion 268b, and a third aperture portion 268c. The first aperture portion 268a has is substantially ring-shaped and defines a first diameter d15. The second aperture portion 268b has a substantially cylindrical shape and defines a second diameter d16 that is less than the first diameter d15. The third aperture portion 286c is substantially circular and has a third diameter d17 that is less than the first and second diameters d15 and d16.

A downwardly protruding annular flange 282 extends between the first aperture portion 268a and the second aperture portion 268b. The first aperture portion 268a is sized to receive the second projection 276. The downwardly protruding annular flange 282 is substantially planar with a distal surface of the second flange 260 of the bracket 220. The second projection 276 and the downwardly protruding annular flange 282 substantially mate, such that the downwardly protruding annular flange 282 contacts the flashing 216 between the first projection 230 and the second projection 276. The second aperture portion 268b is sized to be smaller than the seal 218 to permit pre-loading of the seal 218, to thereby seal the aperture 268 with the seal 218. The first aperture portion 268a, the downwardly protruding annular flange 282 and the second aperture portion 268b, projection 230 and seal 218 work together to form a labyrinth seal to inhibit entry of fluid into the aperture 232.

A notch, channel, recess, or the like, such as the illustrated notch 284, can be defined in the bracket second flange 260. The notch 284 is in fluid communication with the first aperture portion 268a. In the event that fluid flows between the bracket 220 and the flashing 216, the fluid is permitted to flow out through the slit 278 and/or the notch 284. In some embodiments, the slit 278 and notch 284 are substantially aligned and positioned on a downhill side of the roof relative to the projection 230. Gravity is then used to move fluid away from the aperture 232 via the slit 278 and/or notch 284 to further inhibit entry of fluid through aperture 232. Other sizes, shapes, quantities, and configurations of notches can be utilized in combination with the bracket 220.

The bracket 220 can be utilized in the above described embodiments in place of bracket 20 and 120. Alternatively, the brackets 20 and/or 120 can include a notch similar to the illustrated notch 284 to provide a path for fluid to flow away from the respective apertures 32, 132, 133. The bracket 220 can further include a tapered portion, similar to the tapered portions of brackets 20A and 120A. The bracket 220 with a tapered portion can be utilized in place of brackets 20A and 120A and can be shaped to mate with seal 18A. In some embodiments, the brackets 20A and/or 120A can include a notch similar to the illustrated notch 284 to provide a path for fluid flow away from the respective apertures 32, 132, 133.

FIGS. 43-47 illustrate another embodiment of a roofing system 310 according to the present invention. This embodiment employs much of the same structure and has many of the same properties as the embodiments of the roofing systems 10, 110, 210 described above in connection with FIGS. 1-42. Accordingly, the following description focuses primarily upon structure and features that are different than the embodiments described above in connection with FIGS. 1-42. Reference should be made to the description above in connection with FIGS. 1-42 for additional information regarding the structure and features, and possible alternatives to the structure and features of the roofing system 310 illustrated in FIGS. 43-47 and described below. Features and elements in the embodiment of FIGS. 43-47 corresponding to features and elements in the embodiments described above in connection with of FIGS. 1-42 are numbered in the 300 series of reference numbers.

FIGS. 43-47 illustrate a fourth flashing 316 associated with the present invention. The fourth flashing 316 is substantially in the shape of a rectangular sheet having square corners. The flashing 316 extends substantially along a plane but includes an upwardly extending projection 330 that tapers upward, out of the plane. The upwardly extending projection 330 has a first diameter d17 in the plane, and a second diameter d18 in a second plane that is substantially parallel to but spaced from the plane. The second diameter d18 is less than the first diameter d17, to form a truncated cone or frustoconical shape. The diameters d17 and d18 can be the same as or different than the diameters d1 and d2 of the projection 30 described above.

The projection 330, like the projections 30, 130, and 230, can define an aperture 332 positioned substantially in the second plane. The illustrated upwardly extending projection 330 and aperture 332 are circular, but in other embodiments, can be square, triangular, pentagonal, hexagonal, ovular, or other regular or irregular shapes. The illustrated aperture 332 is substantially centered on the upwardly extending projection 330, but other, non-centered embodiments are possible. The fourth flashing 316 has a first side 334 and a second side 336 opposite the first side 334. The first side 334 and the second side 336 are substantially planar apart from the projection 330.

The flashing 316 can further define other non-planar features, such as a trench 386 extending circumferentially around the projection 330 and a channel 388, extending between the trench 386 and an edge of the flashing 316. The trench 386 can provide a pathway for fluid around the projection 330 to inhibit fluid flow up the projection 330, similar to the function of the projection ridge 276 shown in FIGS. 35-39. The channel 388 can provide a pathway for fluid to move away from the projection 330, similar to the function of the slit 278 shown in FIGS. 35-39.

Moisture can be moved or drawn away from the aperture 232 by at least one of wicking, capillary action, surface tension, gravity, and evaporation. In some embodiments, the channel 388 is positioned on a downhill side of the roof relative to the aperture 332 to utilize gravity to move fluid away from the projection 330. The trench 386 can further direct fluid away from the projection 330 to inhibit leakage of water into the aperture 232. In some embodiments, the channel 388 includes a cutout, scoring or downwardly protruding extension that extends a portion of the way to the edge of the flashing to further move fluid away from the projection 330 and aperture 332.

Although not specifically illustrated, a seal, such as seal 18, 18A, 118 or 218 can be inserted into the aperture 332, similar to the embodiments described above for seals 18, 18A, 118, and 218. Reference should be made to the descriptions of the above-described and illustrated seals 18, 18A, 118, and 218 for specific details on seals that can be utilized with flashing 316. The seal can contact both the first side 334 and the second side 336 of the flashing 316. In the instance that fluid would flow past the trench 386 and up the projection 330, seal 318 would inhibit the fluid from entering the aperture 332.

The seal can be inserted into the apertures 332 using any of the methods described above. The projection 330, aperture 332, trench 386, and channel 388 can be formed into the flashing 316 during the same operation or by the same machine as when the seal is inserted into the aperture 332. In other embodiments, the projection 330, trench 386, channel 388, and aperture 432 can be formed into the flashing 316 prior to inserting the seal into the aperture 332.

Figure 47:
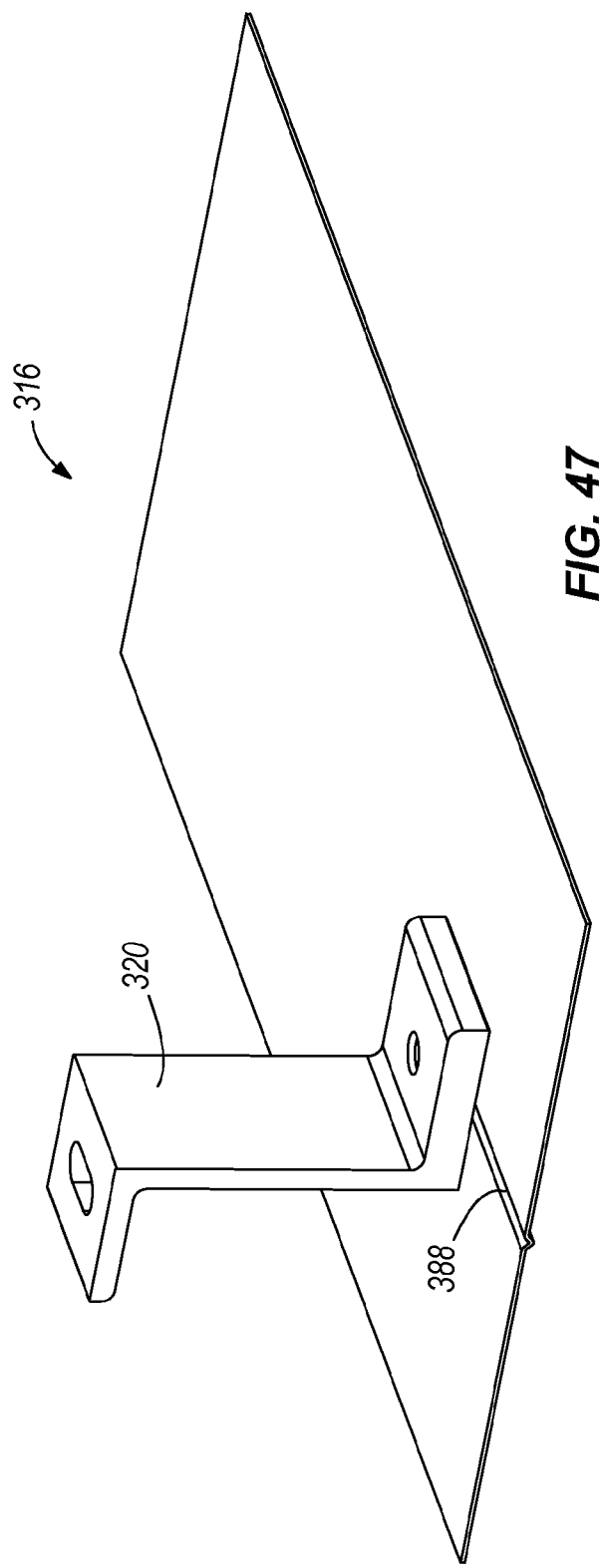
FIG. 47 is a perspective view of an assembly including the flashing shown in FIG. 43 and a bracket.

As shown in FIG. 47, a bracket 320 can be coupled to the flashing 316. Although a bracket similar to bracket 20 is shown, any of the above-described brackets, such as 20, 20A, 120, 120A or 220, can be utilized with the flashing 316. The flashing 316 can define two projections and thereby two trenches and a channel joining the trenches and extending to an edge of the flashing 316. In another embodiment, the flashing 316 can define two projections and two trenches, such that each trench joins a separate channel and each channel separately extends to an edge of the flashing 316. Other combinations and configurations of projections, slits, trenches and channels can be utilized within the scope of the present invention.

Figure 49:
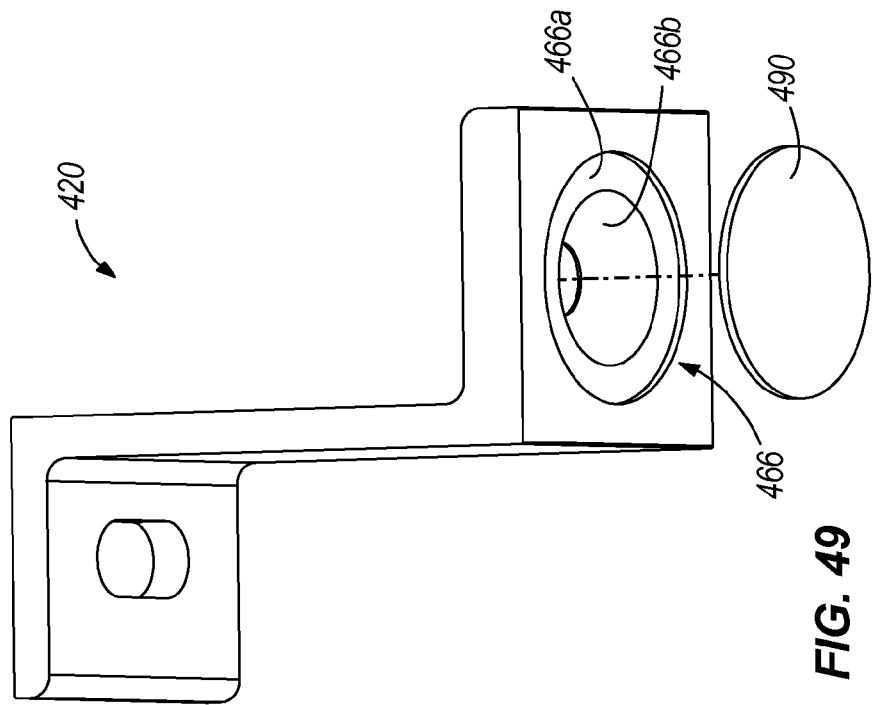
FIG. 49 is a bottom perspective of the bracket and membrane of FIG. 48.
Figure 48:
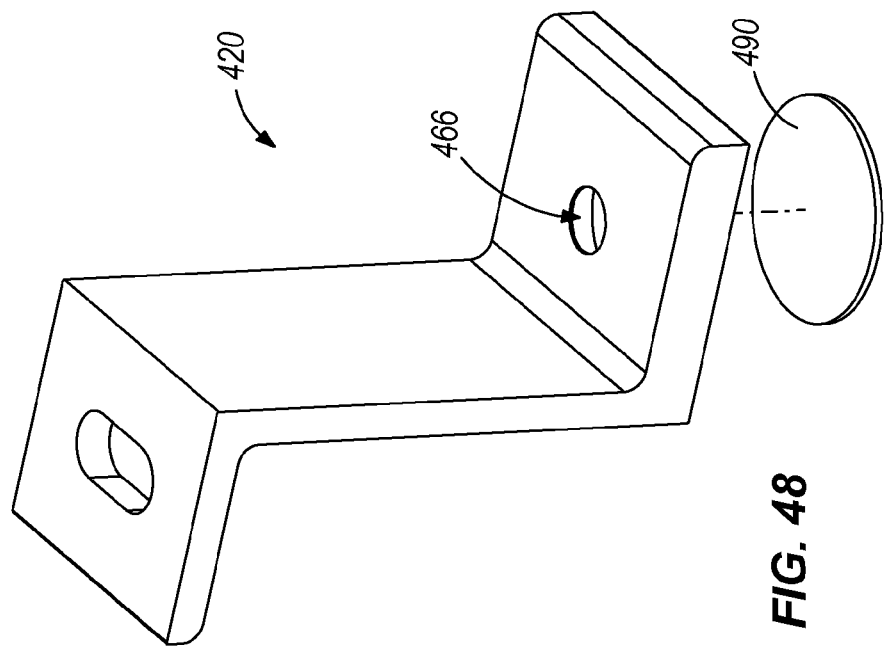
FIG. 48 is a top perspective view of a bracket including a membrane exploded off of the bracket for clarity.

FIGS. 48 and 49 illustrate another embodiment of a bracket 420 according to the present invention. This embodiment employs much of the same structure and has many of the same properties as the embodiments of the brackets 20, 20A, 120, 120A, 220 or 320 described above in connection with FIGS. 1-47. Accordingly, the following description focuses primarily upon structure and features that are different than the embodiments described above in connection with FIGS. 1-47. Reference should be made to the description above in connection with FIGS. 1-47 for additional information regarding the structure and features, and possible alternatives to the structure and features of the bracket 420 illustrated in FIGS. 48 and 49 and described below. Features and elements in the embodiment of FIGS. 48 and 49 corresponding to features and elements in the embodiments described above in connection with of FIGS. 1-47 are numbered in the 400 series of reference numbers.

FIGS. 48 and 49 illustrate a bracket 420 similar to the bracket 20A shown in FIGS. 13A and 14A. The bracket 420 further includes a flexible membrane 490 coupled thereto adjacent aperture 466. The aperture 466 can be sized to receive the flexible membrane 490 in a first aperture portion 466a, that has a diameter substantially equal to a diameter of the flexible membrane 490. The aperture 466 can further include a second aperture portion 466b that is substantially tapered or frustoconical and has first and second diameters, both of which are less than the membrane diameter.

The flexible membrane 490 can be permanently or removably coupled to the bracket 420. The flexible membrane 490 can be affixed to the bracket 420 by a suitable adhesive. In some embodiments, a protective sheet or "sticker" is affixed to the flexible membrane 490 to protect the membrane 490 during manufacturing and shipping. The sticker is then removed from the membrane 490 prior to installation. The flexible membrane 490 can comprise a polymer, rubber, plastic or other suitable elastomeric material.

The bracket 420 can be coupled to any of the above-described flashing 16, 116, 216 or 316 or any other suitable flashing. The aperture 466 is sized to receive at least one of a projection and a seal, such as any of the projections and seals described herein. The flexible membrane 490 can deform around a projection without rupturing or cracking. In some embodiments, the flexible membrane 490 is used in place of a seal because the flexible membrane 490 sufficiently seals the aperture 466. A fastener, such as any of the fasteners illustrated and described herein can be inserted into the flexible membrane 490 to form an aperture in the flexible membrane 490. The flexible membrane 490 is operable to substantially retain its shape and resist further tearing or ripping. The flexible membrane 490 can closely adhere to the fastener to substantially seal the aperture 466. In embodiments that utilize brackets like 120 or 120A, a flexible membrane can be coupled to the bracket adjacent each aperture, whereas in other embodiments, a single flexible membrane can be coupled to the bracket covering both apertures.

Figure 50:
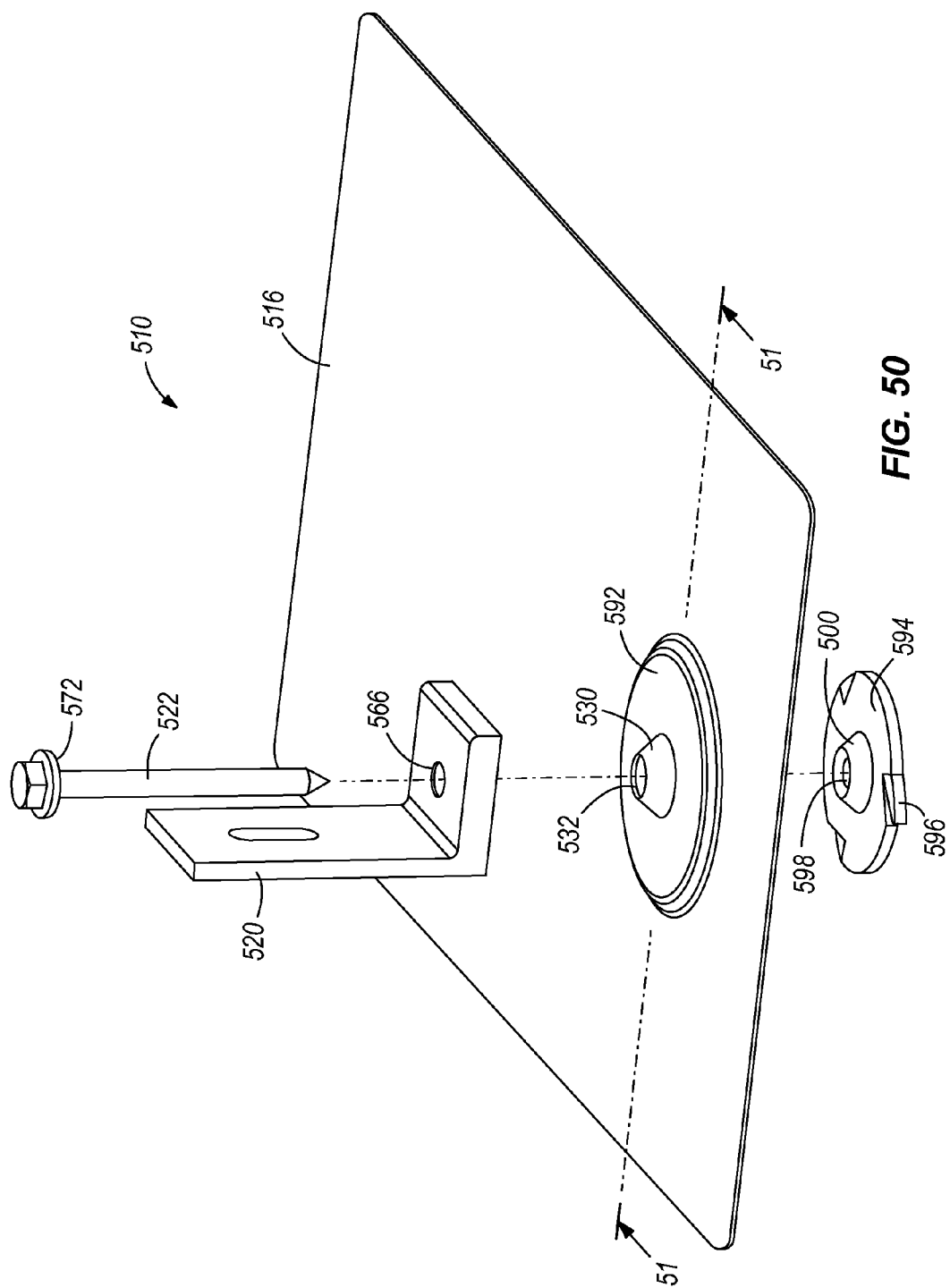
FIG. 50 is an exploded view of another roofing system embodiment.
Figure 51:
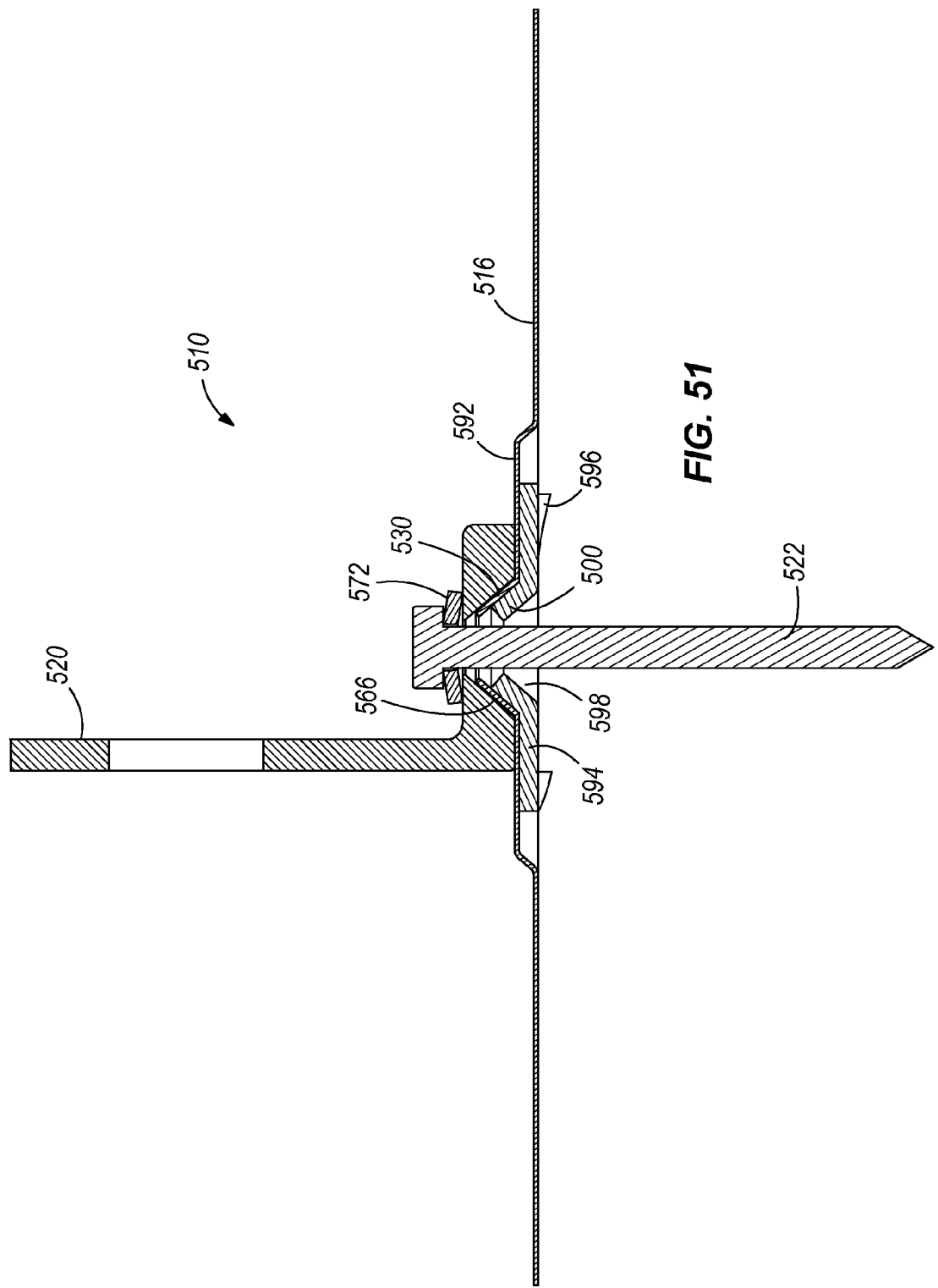
FIG. 51 is a cross-sectional view of FIG. 50, taken along line 51-51 of FIG. 50.

FIGS. 50 and 51 illustrate another embodiment of a roofing system 510 according to the present invention. This embodiment employs much of the same structure and has many of the same properties as the embodiments of the roofing systems described above in connection with FIGS. 1-49. Accordingly, the following description focuses primarily upon structure and features that are different than the embodiments described above in connection with FIGS. 1-49. Reference should be made to the description above in connection with FIGS. 1-49 for additional information regarding the structure and features, and possible alternatives to the structure and features of the roofing system 510 illustrated in FIGS. 50 and 51 and described below. Features and elements in the embodiment of FIGS. 50 and 51 corresponding to features and elements in the embodiments described above in connection with of FIGS. 1-49 are numbered in the 500 series of reference numbers.

FIGS. 50 and 51 illustrate another roofing system 510 including flashing 516, a bracket 520, a fastener 522, and a compression washer 572. In some embodiments, such as the illustrated embodiment of FIGS. 50 and 51, the flashing 516 is formed of a rigid or semi-rigid material and includes a first projection 530 similar to the previously-described projections 30, 130, 230, and 330. In other embodiments, the flashing 516 can be elastic or membranous, or alternatively, rigid or semi-rigid flashing can be supplemented with a flexible membrane. The flexible membrane can be similar to the flexible membrane 490 or can extend over substantially the entire surface area of the flashing 516. The flexible membrane can comprise a polymer, rubber, plastic or other similar material.

In embodiments in which the flexible membrane replaces the flashing 516, the projections 530 and 592 need not be formed into the flexible membrane. Rather, the flexible membrane can stretch and conform to the base 594 to include projections similar in shape and size to projections 530 and 592.

In the illustrated embodiments of FIGS. 50 and 51, the flashing 516 further includes a second projection 592 that extends in substantially the same direction as the first projection 530. The second projection 592 can be substantially circular, as illustrated, or can be ovular, square, rectangular, triangular or other regular or non-regular shape. The second projection 592 is sized to at least partially receive or engage a rigid base 594 between the flashing 516 and a roof substrate. In embodiments in which the flashing 516 can be elastic or membranous, the first and/or second projections 530, 592 can be formed when the flashing 516 is draped across the base 594.

The illustrated base 594 is substantially circular, but can be ovular, square, rectangular, triangular or other regular or non-regular shapes. The geometry of the base 594 can correspond with the geometry of the second projection 592, or as mentioned above, can cause the flashing 516 to be formed around the contours of the base 594 such that the flashing 516 matingly engages the base 594.

The base 594 can include at least one tooth 596 depending downwardly therefrom. The illustrated base 594 includes three teeth 596 extending away from the flashing 516. The teeth 596 can bear against or grip a roof substrate to inhibit movement of the flashing 516 with respect to the roof substrate. In some embodiments, a user can press, push or pound the base 594 against the roof substrate, such as with a hammer. The base 594 retains the flashing 516 against the roof substrate to limit or eliminate gaps created by movement of the flashing 516 relative to the roof, roof substrate, and the like. The base 594 further permits the fastener 522 to be tightened against the flashing 516 and the bracket 520 without denting, deforming or damaging the flashing 516.

The illustrated base 594 further includes an aperture 598 and a projection 500 through which the aperture 598 extends. The illustrated aperture 598 and projection 500 are substantially centered on the base 594. The aperture 598 is sized to receive the fastener 522 and can be the same size or a similar size as aperture 532. The illustrated projection 500 extends into the space provided by the projection 530, and substantially mates with the projection 530, such that projections 530 and 500 extend together. The projections 530 and 500 work together to inhibit relative movement of the flashing 516 with respect to the roof.

The illustrated bracket 520 is substantially L-shaped and includes an elongate body portion 552 and a first flange 558. The illustrated elongate body portion 552 includes an aperture 569 that is sized to receive a fastener to support at least one of a snow guard, a snow fence, a solar panel, an antenna, a sign, and a billboard, or related components. The illustrated first flange 558 includes a tapered aperture 566 that is sized to at least partially receive the first projection 530 and the washer projection 500. The tapered aperture 566 is also sized to receive the fastener 522 therethrough.

In the illustrated embodiment, the compression washer 572 includes a washer and a seal, such as an o-ring. The fastener 522 has a head that bear against the washer and the washer bears against the o-ring to provide a resilient seal between the fastener head and the bracket 520.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Figures 52, 53:
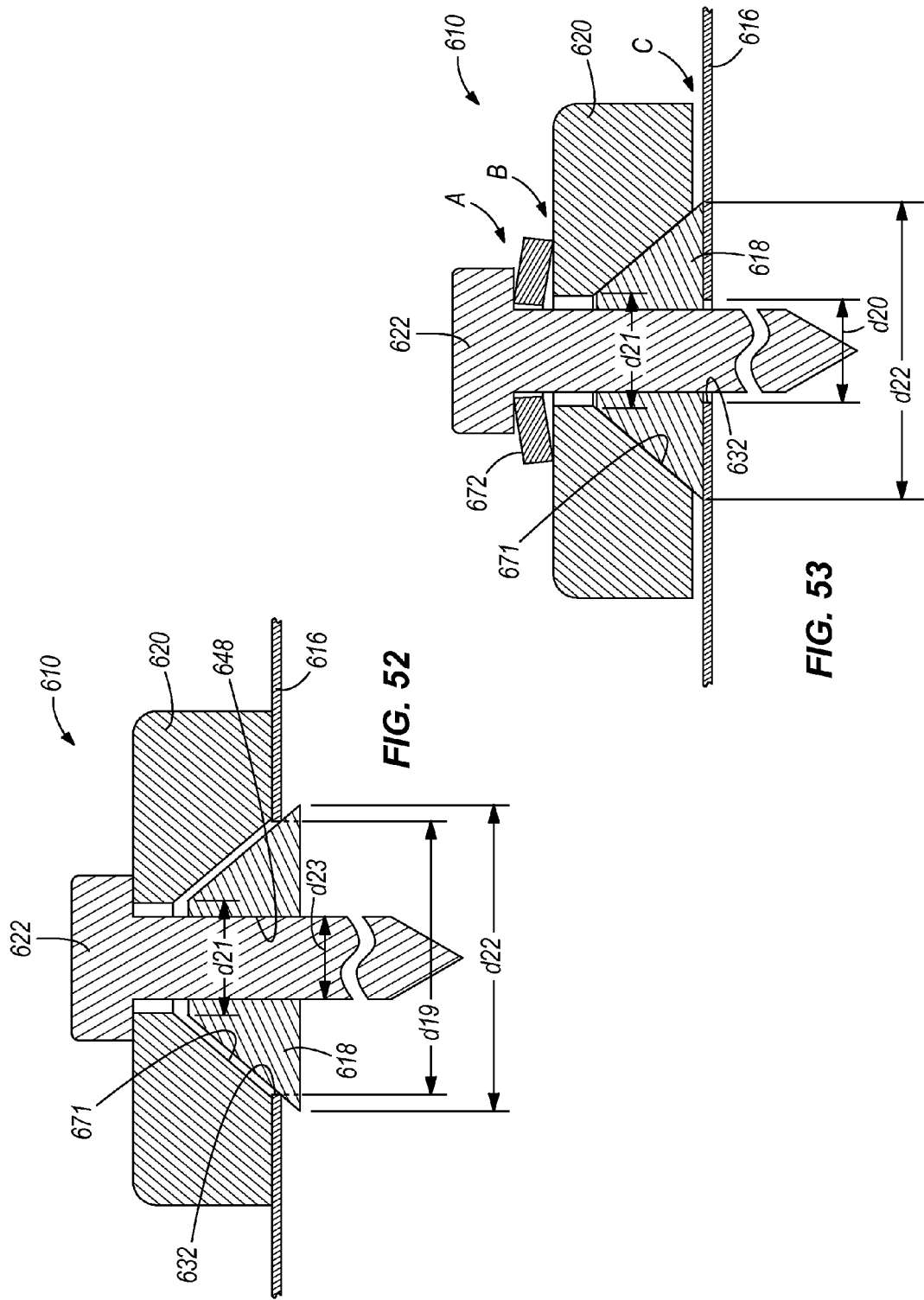
FIG. 52 is a partial cross-sectional view of a roofing system according to another embodiment of the present invention.
FIG. 53 is a partial cross-sectional view of the roofing system of FIG. 52 with a flashing arrangement according to an alternate embodiment.

FIGS. 52 and 53 illustrate another embodiment of a roofing system 610 according to the present invention. This embodiment employs much of the same structure and has many of the same properties as the embodiments of the roofing systems described above in connection with FIGS. 1-51. Accordingly, the following description focuses primarily upon structure and features that are different than the embodiments described above in connection with FIGS. 1-51. Reference should be made to the description above in connection with FIGS. 1-51 for additional information regarding the structure and features, and possible alternatives to the structure and features of the roofing system 610 illustrated in FIGS. 52 and 53 and described below. Features and elements in the embodiment of FIGS. 52 and 53 corresponding to features and elements in the embodiments described above in connection with of FIGS. 1-51 are numbered in the 600 series of reference numbers.

FIGS. 52 and 53 illustrate a roofing system 610 that includes a piece of flashing 616 defining an aperture 632 therethrough. The flashing aperture 632 defines a diameter d19 in FIG. 52 and diameter d20 in FIG. 53. The diameter d19 of FIG. 52 is greater than the diameter d20 of FIG. 53. In some embodiments, the flashing 616 can include a projection defining a substantially frustoconical shape, similar to the projections described above. The roofing system 610 further includes a roof bracket 620, which can include any of the previously-illustrated and described brackets. The illustrated bracket 620 is only partially shown, to more clearly illustrate the details of the engagement between the bracket 620 and the flashing 616. The illustrated bracket 620 includes an aperture 671 extending through the bracket 620 and having a substantially frustoconical shape.

The roofing system 610 also includes a seal 618 having a generally frustoconical shape and defining an aperture 648 extending therethrough. The seal 618 has a first narrow end 641 that defines a narrow seal diameter d21 and a second wide end 643 that defines a wide seal diameter d22. The narrow seal diameter d21 is less than the wide seal diameter d22. The first narrow end is spaced from the roof surface and the second wide end is proximate to or adjacent to the roof surface.

The roofing system 610 further includes at least one fastener, such as the illustrated fastener 622. The fastener 622 can be any threaded or unthreaded fastener suitable to retain the roofing system 610 on a roof. The fastener 622 extends through the flashing aperture 632, the seal aperture 648, and the bracket aperture 671. The fastener 622 has a fastener diameter d23, that is less than the flashing diameter d19 of FIG. 52 and is less than or substantially equal to the flashing diameter d20 of FIG. 53. The diameter of the fastener 622 is less than or substantially equal to the narrow seal diameter d21 and is less than the wide seal diameter d22. The seal aperture 648 can be sized to receive the fastener 622 and to optionally form a substantially water-tight seal with the fastener 622.

The roofing system 610 can further include a washer 672, as illustrated in FIG. 53. The washer 672 can be included in the embodiment of FIG. 52, or could be omitted from the embodiment illustrated in FIG. 53. The washer 672 can be a polymeric compression washer to provide a substantially water-tight seal between the fastener 622 and the bracket aperture 671. In some embodiments, the washer 672 can be omitted or can be replaced by an o-ring or an applied sealant, such as caulk. Alternatively or in addition, the washer 672 can include a stiffening element, such as, for example, a rigid backing, to provide additional support. The washer 672 can have an aperture that defines an diameter that is larger than or substantially equal to the diameter of the fastener 622.

FIG. 53 illustrates possible leak points of the roofing system 610. A first possible leak point A is between the head of the fastener 622 and the washer 672. A second possible leak point B is between the washer 672 and the bracket 620. A third possible leak point C is between the bracket 620 and the flashing 616. The washer 672, the fastener 622, the bracket 620 and the seal 618 work together to substantially inhibit or prevent flow of fluid through first and second leak points A, B. The bracket 620, the seal 618 and the flashing 616 work together to substantially inhibit or prevent flow of fluid through the third leak point C.

The embodiments described above and illustrated in the figures are presented by way of example only and are not intended as a limitation upon the concepts and principles of the present invention.

What is claimed is:

1. A roof mounting system comprising:
   a roof substrate;
   flashing supportable on the roof substrate and including a top surface spaced from the roof substrate, a bottom surface, and an outwardly extending projection having a concave interior side, the flashing defining an aperture extending through the projection between the top surface and the bottom surface;
   a seal for inhibiting fluid entry through the aperture, the seal extending through the aperture such that the seal contacts at least a portion of the top surface of the flashing and at least a portion of the bottom surface of the flashing, the seal being conformable with the concave interior side and defining a seal aperture substantially aligned with the flashing aperture;
   a mounting bracket supportable on the flashing and defining an aperture sized to receive at least a portion of each of the seal and the projection; and
   a fastener extending through the mounting bracket aperture, the seal aperture, and the flashing aperture, wherein the seal is operable to inhibit fluid flow through the flashing aperture.

2. The roof mounting system of claim 1, wherein the seal further comprises:
   a first flange at least partially engaging the top surface of the flashing and having a first diameter;
   a second flange at least partially engaging the bottom surface of the flashing and having a second diameter; and
   a stem extending between the first and second flanges and having a third diameter less than each of the first diameter and the second diameter, the seal aperture extending through each of the first flange, the second flange, and the stem.

3. The roof mounting system of claim 2, wherein the seal aperture is substantially aligned with the flashing aperture and the mounting bracket aperture.

4. The roof mounting system of claim 2, wherein the first flange has substantially parallel top and bottom surfaces, and wherein the stem has a substantially frustoconical shape.

5. The roof mounting system of claim 2, wherein the bottom surface of the second flange is substantially parallel to the top surface of the first flange, and wherein the stem has a substantially frustoconical shape.

6. The roof mounting system of claim 1, wherein a portion of the seal is deformable to conform to and substantially fill a space defined between the concave interior side of the projection, the fastener, and the roof substrate.

7. The roof mounting system of claim 6, wherein the portion of the seal is a first seal portion, and wherein a second seal portion is deformable to conform to and substantially fill an area of the mounting bracket aperture around the fastener.

8. The roof mounting system of claim 1, wherein the mounting bracket secures at least one of a snow fence, a solar panel, and an antenna component, to the roof substrate.

9. The roof mounting system of claim 1, wherein a rim extends outwardly from the flashing and around an outer circumference of the flashing projection, and wherein an opening communicates between an interior of the rim and an exterior for venting moisture away from the mounting bracket.

10. The roof mounting system of claim 9, wherein a channel extends into the flashing and outwardly away from the opening defined by the rim.

11. The roof mounting system of claim 1, wherein the mounting bracket includes a lower surface engageable with the flashing, wherein a recess extends through the lower surface and at least partially around the mounting bracket aperture, and wherein an opening extends through a side surface of the mounting bracket communicating between the recess and an exterior of the mounting bracket to vent moisture away from the mounting bracket.

12. The roof mounting system of claim 1, wherein the projection has a frustoconical exterior end.

13. The roof mounting system of claim 1, wherein the seal extends into and is matingly received in the mounting bracket aperture.

14. The roof mounting system of claim 1, further comprising a washer positioned between the fastener and the mounting bracket, the washer operable to inhibit flow of moisture into the mounting bracket aperture.

15. The roof mounting system of claim 1, wherein the seal is a single, monolithic piece.

16. A roof mounting system comprising:
a roof substrate;
flashing secured to the roof substrate, the flashing including a first projection and a second projection, the second projection having a substantially frustoconical shape, the flashing defining a flashing aperture extending through the second projection;
a rigid base positionable between the roof substrate and the flashing and including
a top surface spaced from the roof substrate and having an outwardly extending projection forming a frustoconical end,
a bottom surface,
an aperture extending through the projection of the rigid base and communicating between the top and bottom surfaces, and
a tooth extending outwardly from the bottom surface and being engageable with the substrate;
a mounting bracket supportable on the flashing and defining an aperture sized to receive at least a portion of the projection of the rigid base; and
a fastener extending through the mounting bracket aperture, the projection aperture of the rigid base, and the flashing aperture, wherein the second projection is operable to inhibit fluid flow through the projection aperture of the rigid base.

17. The roof mounting system of claim 16, wherein the flashing is a flexible membrane deformable to receive the rigid base between the roof substrate and the flexible membrane.

18. The roof mounting system of claim 17, wherein the fastener is shaped to pierce the flexible membrane to form a membrane aperture and the flexible membrane substantially seals against the fastener adjacent the membrane aperture to inhibit fluid flow through the projection aperture.

19. The roof mounting system of claim 16, wherein the rigid base includes a plurality of teeth extending outwardly from the bottom surface, the teeth engageable with the roof substrate to inhibit at least one of rotation and translation of the rigid base with respect to the roof substrate.

20. The roof mounting system of claim 16, further comprising a washer positioned between a head of the fastener and the roof bracket sized to distribute a force from the fastener head onto the roof bracket.

21. The roof mounting system of claim 16, further comprising a sealing ring positioned between a head of the fastener and the roof bracket, the sealing ring operable to inhibit flow of fluid between the fastener head and the roof bracket.

22. The roof mounting system of claim 16, further comprising a spring washer positioned between a head of the fastener and the roof bracket, the spring washer bears against the roof bracket to bias the roof bracket into engagement with the rigid base projection to inhibit flow of fluid between the fastener and the rigid base aperture.

23. A roof mounting system comprising:
a roof bracket defining a bracket aperture, the bracket aperture having a generally frustoconical shape;
a flashing defining a flashing aperture extending therethrough;
a seal having a generally frustoconical shape and defining a seal aperture extending therethrough; and
a fastener sized to extend through the bracket aperture, the flashing aperture and the seal aperture to couple the roof bracket, flashing and seal to a roof surface, the fastener positioned to press the roof bracket into abutment with the flashing and the seal to inhibit flow of fluid through at least one of the bracket aperture, the flashing aperture and the seal aperture.

24. The roof mounting system of claim 23, further comprising a washer positioned between a head of the fastener and the roof bracket to distribute a force from the fastener to the roof bracket.

25. The roof mounting system of claim 23, further comprising a sealing ring positioned between a head of the fastener and the roof bracket to further inhibit flow of fluid through the bracket aperture.

26. The roof mounting system of claim 23, further comprising a spring washer positioned between a head of the fastener and the roof bracket to further bias the roof bracket against the flashing and the seal.

27. The roof mounting system of claim 23, wherein the fastener is positioned to bias the roof bracket, flashing and seal against the roof surface to form a substantially water tight seal.

28. The roof mounting system of claim 23, wherein the seal defines a first seal diameter at a narrow end of the seal and a second seal diameter at a wide end of the seal, the second seal diameter is greater than the first seal diameter, wherein the wide end of the seal is adjacent the roof surface.

29. The roof mounting system of claim 28, wherein the bracket aperture defines a first aperture diameter at a narrow end of the bracket aperture and a second aperture diameter at a wide end of the bracket aperture, the second aperture diameter is greater than the first aperture diameter, wherein the wide end of the bracket aperture is proximate to the roof surface and the narrow end of the bracket aperture is distal from the roof surface.

30. The roof mounting system of claim 29, wherein the flashing aperture defines a flashing aperture diameter and the second seal diameter is greater than the flashing aperture diameter.

31. The roof mounting system of claim 28, wherein the flashing aperture defines a flashing aperture diameter and the flashing aperture diameter is less than the second seal diameter.

32. The roof mounting system of claim 23, wherein the flashing defines a protrusion having a generally frustoconical shape.

33. The roof mounting system of claim 23 wherein the seal defines a first seal diameter at a narrow end of the seal and a second seal diameter at a wide end of the seal, the second seal diameter is greater than the first seal diameter and the wide end of the seal is adjacent the flashing.

34. The roof mounting system of claim 33 wherein the seal further includes a throat positioned between the narrow end and the wide end, the throat defining a third seal diameter, the third seal diameter less than the first seal diameter, and the third seal diameter less than the second seal diameter.

35. The roof mounting system of claim 34, wherein the flashing aperture defines a flashing aperture diameter and the second seal diameter is greater than the flashing aperture diameter.

36. The roof mounting system of claim 23, wherein the seal includes a lip, a throat, a frustoconical portion, and a base, the lip defining a lip diameter, the throat defining a throat diameter, and the base defining a base diameter, the lip diameter greater than the throat diameter, the base diameter greater than the throat diameter, the frustoconical portion extending from the throat to the base such that a frustoconical diameter varies from the throat diameter to the base diameter, the throat positioned between the lip and the frustoconical portion, and the frustoconical portion positioned between the throat and the base.

37. The roof mounting system of claim 36, wherein the flashing aperture defines a flashing aperture diameter and the second seal diameter is greater than the flashing aperture diameter.

38. The roof mounting system of claim 37, further comprising a washer positioned between a head of the fastener and the roof bracket to distribute a force from the fastener to the roof bracket.

39. A roof mounting system comprising:
a roof bracket including a bracket aperture extending therethrough, the bracket aperture defining a first bracket aperture diameter and a second bracket aperture diameter, the second bracket aperture diameter greater than the first bracket aperture diameter;
a flashing including a flashing aperture extending therethrough;
a seal including a seal aperture extending therethrough, the seal defining a first seal diameter and a second seal diameter, the second seal diameter greater than the first seal diameter, the seal configured to be positioned within the bracket aperture, wherein the seal includes a longitudinal axis and a frustoconical portion, the frustoconical portion extends along the longitudinal axis such that a frustoconical diameter varies from the first seal diameter to the second seal diameter; and
a fastener extending through the bracket aperture, the flashing aperture, and the seal aperture.

40. The roof mounting system of claim 39, wherein the seal includes a longitudinal axis, a throat, and a frustoconical portion, the throat extending along the longitudinal axis such that a throat diameter is constant and equal to the first seal diameter, and the frustoconical portion positioned adjacent the throat and extending along the longitudinal axis such that a frustoconical diameter varies from the first seal diameter to the second seal diameter.

41. The roof mounting system of claim 40, wherein the seal further includes a lip, the lip defining a lip diameter greater than the first seal diameter, and the throat is positioned between the lip and the frustoconical portion.

42. The roof mounting system of claim 41, wherein the seal further includes a base, the base extending along the longitudinal axis such that a base diameter is constant and equal to the second seal diameter, and the frustoconical portion is positioned between the throat and the base.

43. The roof mounting system of claim 42, further comprising a washer; and
wherein the fastener includes a head, the washer positioned between the head and the roof bracket.

44. The roof mounting system of claim 40, wherein the seal further includes a base, the base extending along the longitudinal axis such that a base diameter is constant and equal to the second seal diameter, and the frustoconical portion is positioned between the throat and the base.

45. The roof mounting system of claim 44, further comprising a washer; and
wherein the fastener includes a head, the washer positioned between the head and the roof bracket.

46. The roof mounting system of claim 39, wherein the frustoconical diameter varies at a constant rate from the first seal diameter to the second seal diameter.

47. The roof mounting system of claim 46, wherein the seal further includes a throat, the throat extending along the longitudinal axis such that a throat diameter is constant and equal to the first seal diameter, and the frustoconical portion is positioned adjacent the throat.

48. The roof mounting system of claim 47, wherein the seal further includes a lip, the lip defining a lip diameter greater than the first seal diameter, and the throat is positioned between the lip and the frustoconical portion.

49. The roof mounting system of claim 48, wherein the seal further includes a base, the base extending along the longitudinal axis such that a base diameter is constant and equal to the second seal diameter, and the frustoconical portion is positioned between the throat and the base.

50. The roof mounting system of claim 49, further comprising a washer; and
wherein the fastener includes a head, the washer positioned between the head and the roof bracket.

* * * * *